United States Patent
Tomida et al.

(10) Patent No.: US 7,747,368 B2
(45) Date of Patent: Jun. 29, 2010

(54) VEHICLE DAMPING FORCE CONTROL WITH ROLL ANGLE AND PITCH ANGLE

(75) Inventors: Koichi Tomida, Toyota (JP); Yusuke Mizuguchi, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 209 days.

(21) Appl. No.: 11/915,477

(22) PCT Filed: Apr. 11, 2006

(86) PCT No.: PCT/JP2006/308004

§ 371 (c)(1),
(2), (4) Date: Nov. 26, 2007

(87) PCT Pub. No.: WO2006/126342

PCT Pub. Date: Nov. 30, 2006

(65) Prior Publication Data

US 2009/0234537 A1 Sep. 17, 2009

(30) Foreign Application Priority Data

May 24, 2005 (JP) .............................. 2005-150956

(51) Int. Cl.
B60G 17/016 (2006.01)
B60G 17/018 (2006.01)

(52) U.S. Cl. .............................. 701/38; 701/36; 701/37; 280/5.507

(58) Field of Classification Search ................... 701/38, 701/36, 37; 280/5.507

See application file for complete search history.

(56) References Cited

U.S. PATENT DOCUMENTS

| 4,761,022 | A | * | 8/1988 | Ohashi et al. | ............ 280/5.504 |
| 5,090,727 | A | * | 2/1992 | Kii et al. | ................... 280/5.508 |
| 5,322,318 | A | | 6/1994 | Kimura et al. | |
| 5,398,184 | A | | 3/1995 | Yamaoka et al. | |
| 5,490,068 | A | | 2/1996 | Shimizu et al. | |
| 6,366,841 | B1 | * | 4/2002 | Ohsaku | ........................ 701/37 |
| 7,222,007 | B2 | * | 5/2007 | Xu et al. | ........................ 701/38 |
| 2005/0189729 | A1 | * | 9/2005 | Dorr | ........................ 280/5.507 |

FOREIGN PATENT DOCUMENTS

EP    0 306 004    3/1989

(Continued)

*Primary Examiner*—Thomas G Black
*Assistant Examiner*—Sze-Hon Kong
(74) *Attorney, Agent, or Firm*—Oblon, Spivak, McClelland, Maier & Neustadt, L.L.P.

(57) ABSTRACT

A damping force control apparatus with adjustable shock absorbers is disclosed. An electronic control unit calculates estimated roll angle and estimated pitch angle of a vehicle body based on detected sprung accelerations, calculates a target pitch angle from the estimated roll angle, and determines target damping force required for front-wheel-side shock absorbers such that the stimulated pitch angle coincides with the target pitch angle; calculates rear-wheel-side jack-up force exerted on the rear-wheel-side vehicle body based on detected vehicle speed detected yaw rate and detected lateral acceleration, and determines the force in the direction for overcoming the calculated jack-up force as target damping force of rear-wheel-side shock absorbers; and controls the operation of each actuator based on the rear-wheel-side and front-wheel-side target damping forces.

13 Claims, 13 Drawing Sheets

FOREIGN PATENT DOCUMENTS

| | | |
|---|---|---|
| EP | 0 416 560 | 3/1991 |
| JP | 2-179528 | 7/1990 |
| JP | 7-117436 | 5/1995 |
| JP | 7-228114 | 8/1995 |
| JP | 2001-1735 | 1/2001 |
| JP | 3509544 | 1/2004 |

* cited by examiner (A)

(B)

VEHICLE DAMPING FORCE CONTROL WITH ROLL ANGLE AND PITCH ANGLE

TECHNICAL FIELD

The present invention relates to a vehicle damping force control apparatus provided with shock absorbers capable of changing damping force, and more particularly, to a vehicle damping force control apparatus that controls damping force of each shock absorber during the turning of the vehicle for enhancing driveability of the vehicle.

BACKGROUND ART

Conventionally, there has been widely known, as this type of a damping force control apparatus, the one in which a virtual vehicle model having mounted at a virtual point at the inner side of the turning locus a lift-suppression-use shock absorber for suppressing a lift-up of a vehicle body and a roll-suppression-use shock absorber for suppressing a roll of the vehicle body is adapted to an actual vehicle model having shock absorbers disposed between the vehicle body and each of four wheels, as disclosed in the Japanese Patent No. 3509544.

In this damping force control apparatus, a difference is produced between the total of the damping forces generated by the shock absorbers at the outer wheels of the turning locus and the total of the damping forces generated by the shock absorbers at the inner wheels of the turning locus so as to set the damping force of the shock absorbers at the inner wheels of the turning locus relatively higher than the damping force of the shock absorbers at the outer wheels of the turning locus, in order to suppress the roll of the vehicle body as well as to suppress the lift-up of the vehicle body at the inner wheels of the turning locus. Therefore, the rise of the vehicle at the center of gravity during the turning is suppressed, so that the roll of the vehicle body is suppressed. Consequently, driveability during the turning of the vehicle can be enhanced.

Meanwhile, during the turning of the vehicle, jack-up force is exerted on the vehicle body, i.e., force in the direction of lifting up the vehicle body is exerted on the vehicle body due to the geometry change of a suspension system caused by lateral force produced on the wheels. In the damping force control apparatus disclosed in the Japanese Patent No. 3509544, the damping coefficients of the lift-suppression-use shock absorber and the roll-suppression-use shock absorber are suitably set by considering the jack-up force, whereby the driveability can be enhanced even if the jack-up force is exerted on the vehicle body.

However, in the damping force control apparatus disclosed in the Japanese Patent No. 3509544, the damping forces of the front-wheel-side shock absorbers corresponding to the front wheels and the damping forces of the rear-wheel-side shock absorbers corresponding to the rear wheels are independently controlled, in which the balance of the input applied to the front-wheel-side vehicle body and the rear-wheel-side vehicle body in the vertical direction is not at all considered. Therefore, a difference is caused between the jack-up forces exerted on the front-wheel-side vehicle body and the rear-wheel-side vehicle body, or between the inputs applied to the front-wheel-side vehicle body and the rear-wheel-side vehicle body in the vertical direction due to the vehicle structure and weight balance, so that a problem of occurring a pitching during the turning of the vehicle arises.

DISCLOSURE OF THE INVENTION

The present invention is accomplished in view of the aforesaid problems, and aims to provide a damping force control apparatus that can suppress a pitching during the turning of a vehicle with a control of the damping force of front-wheel-side shock absorbers and the damping force of rear-wheel-side shock absorbers, considering jack-up force exerted on the vehicle body during the turning of the vehicle.

In order to attain the aforesaid object, the feature of the present invention is a vehicle damping force control apparatus comprising shock absorbers disposed between a vehicle body and each of four wheels suspended to the vehicle body by a suspension system, each of which can individually change generated damping force in accordance with the turning state of the vehicle, the damping force control apparatus comprising front-wheel and rear-wheel damping force control means that respectively controls the total of the damping forces generated by the front-wheel-side shock absorbers corresponding to the front wheels and the total of the damping forces generated by the rear-wheel-side shock absorbers corresponding to the rear wheels such that force in the upward direction or downward direction is applied to the front-wheel-side vehicle body and the rear-wheel-side vehicle body in the direction in which a pitching caused on the vehicle body during the turning of the vehicle is suppressed.

In this case, the front-wheel and rear-wheel damping force control means preferably comprises front-wheel-side jack-up force calculating means that calculates front-wheel-side jack-up force applied to the vehicle body through the front-wheel-side suspension system during the turning of the vehicle; rear-wheel-side jack-up force calculating means that calculates rear-wheel-side jack-up force applied to the vehicle body through the rear-wheel-side suspension system during the turning of the vehicle; front-wheel-side vehicle body input calculating means that calculates the input total applied to the front-wheel-side vehicle body by adding the calculated front-wheel-side jack-up force to the total of the damping forces generated by the front-wheel-side shock absorbers; rear-wheel-side vehicle body input calculating means that calculates the input total applied to the rear-wheel-side vehicle body so as to overcome a pitching moment about the center of gravity of the vehicle due to the calculated input total applied to the front-wheel-side vehicle body; rear-wheel-side target damping force setting means that sets the total of the damping forces required to the rear-wheel-side shock absorbers as a rear-wheel-side target damping force by subtracting the calculated rear-wheel-side jack-up force from the calculated input total applied to the rear-wheel-side vehicle body; and shock absorber control means that controls the total of the damping forces generated by the rear-wheel-side shock absorbers in accordance with the set rear-wheel-side target damping force.

Further, the front-wheel and rear-wheel damping force control means preferably comprises front-wheel-side jack-up force calculating means that calculates front-wheel-side jack-up force applied to the vehicle body through the front-wheel-side suspension system during the turning of the vehicle; rear-wheel-side jack-up force calculating means that calculates rear-wheel-side jack-up force applied to the vehicle body through the rear-wheel-side suspension system during the turning of the vehicle, rear-wheel-side vehicle body input calculating means that calculates the input total applied to the rear-wheel-side vehicle body by adding the calculated rear-wheel-side jack-up force to the total of the damping forces generated by the rear-wheel-side shock absorbers; front-wheel-side vehicle body input calculating means that calculates the input total applied to the front-wheel-side vehicle body so as to overcome a pitching moment about the center of gravity of the vehicle due to the calculated input total applied to the rear-wheel-side vehicle body; front-wheel-side target damping force setting means that sets the total of the damping forces required to the front-wheel-side shock absorbers as a front-wheel-side target damping force by subtracting the calculated front-wheel-side jack-up force from the calculated input total applied to the front-wheel-side vehicle body; and shock absorber control means that control the total of the damping forces generated by the front-wheel-side shock absorbers in accordance with the set front-wheel-side target damping force.

In this case, the rear-wheel-side jack-up force calculating means may calculate slip angle of rear wheels in accordance with a vehicle speed detected by a vehicle speed sensor, yaw rate detected by a yaw rate sensor and lateral acceleration detected by a lateral acceleration sensor, and may calculate jack-up force generated at the rear wheel side in accordance with the calculated slip angle of the rear wheels. Further, for example, the front-wheel-side jack-up force calculating means may calculate slip angle of front wheels in accordance with steering angle detected by a steering angle sensor in addition to the detected vehicle speed, yaw rate and lateral acceleration, and may calculate jack-up force generated at the front wheel side in accordance with the calculated slip angle of the front wheels.

This configuration makes it possible to respectively control the total of the damping forces generated by the front-wheel-side shock absorbers and the total of the damping forces generated by the rear-wheel-side shock absorbers by considering the jack-up force exerted on the front-wheel-side vehicle body and the rear-wheel-side vehicle body during the turning of the vehicle, for example. Therefore, the inputs in the upward and downward directions exerted on the front-wheel-side vehicle body and the rear-wheel-side vehicle body are balanced, so that a pitching during the turning of the vehicle can be suppressed.

Another feature of the present invention is that the front-wheel and rear-wheel damping force control means comprises roll angle detecting means that detects a roll angle of the vehicle body during the turning of the vehicle; pitch angle detecting means that detects a pitch angle of the vehicle body during the turning of the vehicle; target pitch angle calculating means that calculates a target pitch angle of the vehicle body in accordance with the detected roll angle; target damping force determining means that determines the total of the damping forces required to the front-wheel-side shock absorbers and the total of the damping forces required to the rear-wheel-side shock absorbers as the front-wheel-side target damping force and rear-wheel-side target damping force respectively in order to make the detected pitch angle coincide with the calculated target pitch angle; and shock absorber control means that controls the total of the damping forces generated by the front-wheel-side shock absorbers and the total of the damping forces generated by the rear-wheel-side shock absorbers respectively in accordance with the determined front-wheel-side target damping force and the rear-wheel-side target damping force. In this case, the phrase "the detected pitch angle is made to coincide with the calculated target pitch angle" means that the detected pitch angle is easy to become the target pitch angle. More specifically, it means that the detected pitch angle is easy to be close to the target pitch angle but is difficult to be apart therefrom, and the closed state is easy to be maintained.

In another feature of the present invention, the target pitch angle calculating means is for calculating the target pitch angle such that the posture of the vehicle body becomes forward tilting or horizontal during the turning, for example. The roll angle detecting means may be configured, for example, to include plural sprung acceleration sensors that respectively detect sprung accelerations at the vehicle body (sprung members) at the inner wheels of the turning locus and the outer wheels of the turning locus in the vertical direction and estimated roll angle calculating means that calculates the difference in the acceleration between the center of gravity of the vehicle at the inner wheels of the turning locus and the center of gravity of the vehicle at the outer wheels of the turning locus according to the detected sprung accelerations, and calculates the roll angle about the axis of the vehicle in the longitudinal direction passing the center of gravity of the vehicle according to the difference in acceleration. Further, the pitch angle detecting means may be configured, for example, to include plural sprung acceleration sensors that respectively detect sprung accelerations at the vehicle body (sprung members) at the front wheels and rear wheels in the vertical direction and estimated pitch angle calculating means that calculates the roll angle about the axis of the vehicle in the side-to-side direction passing the center of gravity of the vehicle according to the detected sprung accelerations.

According to this configuration, the total of the damping forces required to the front-wheel-side shock absorbers and the total of the damping forces required to the rear-wheel-side shock absorbers are respectively determined by the target damping force determining means in such a manner that the detected pitch angle is made coincident with the calculated target pitch angle, and the total of the damping forces of the front-wheel-side shock absorbers and the total of the damping forces of the rear-wheel-side shock absorbers are controlled by the shock absorber control means in accordance with the determined respective totals of the damping forces. Therefore, a pitching during the turning of the vehicle can be suppressed, driveability can be enhanced in accordance with the setting of the target pitch angle, and grip feeling to the road surface can be enhanced.

Another feature of the present invention is such that the target pitch angle calculating means calculates the target pitch angle that increases with the increase in the detected roll angle and that is unambiguously determined by the detected roll angle. With this configuration, the target pitch angle is unambiguously determined by the detected roll angle, and has a feature of increasing with the increase in the detected roll angle. Therefore, the phase of the roll angle generated on the vehicle body and the phase of the pitch angle generated on the vehicle body are made coincident with each other, whereby the time difference between the roll angle and the pitch angle is eliminated. As a result, roll feeling, i.e., smooth feeling during the roll can be enhanced.

Still another feature of the present invention is such that the target damping force determining means comprises corrected moment calculating means that calculates a corrected moment necessary for the vehicle body in accordance with the difference between the calculated target pitch angle and the detected pitch angle; front-wheel-side damping force setting means that sets the total of the damping forces generated by the front-wheel-side shock absorbers as the front-wheel-side target damping force in accordance with the calculated corrected moment; rear-wheel-side jack-up force calculating means that calculates rear-wheel-side jack-up force exerted on the vehicle body through the rear-wheel-side suspension system during the turning of the vehicle; and rear-wheel-side damping force setting means that sets the force in the direction for overcoming the calculated rear-wheel-side jack-up force as the rear-wheel-side target damping force.

According to this configuration, the total of the damping forces of the rear-wheel-side shock absorbers is set so as to overcome the rear-wheel-side jack-up force at the rear-wheel-side vehicle body, and the corrected moment is applied at the front-wheel-side vehicle body so as to suppress the pitching of the vehicle body considering the front-wheel-side jack-up force. Therefore, the pitching on the vehicle body is suppressed due to the input applied to the front-wheel-side vehicle body in accordance with the corrected moment, while suppressing the lift-up of the rear-wheel-side vehicle body, whereby roll feeling can further be enhanced.

Still another feature of the present invention is to provide inner-wheel and outer-wheel damping force control means that controls the total of the damping forces generated by the inner-wheel-side shock absorbers corresponding to the wheels at the inner side of the turning locus to be relatively higher than the total of the damping forces generated by the outer-wheel-side shock absorbers corresponding to the wheels at the outer side of the turning locus, in order that the roll exerted on the vehicle body during the turning of the vehicle is suppressed and upward or downward force is exerted on the vehicle body at the inner wheel side of the turning locus and the vehicle body at the outer wheel side of the turning locus in the direction for displacing the center of gravity of the vehicle in the downward direction.

With this configuration, the roll of the vehicle body can be suppressed, while suppressing the rise at the center of gravity of the vehicle by the roll suppression control of the vehicle body, and further, the pitching of the vehicle body can be suppressed. Therefore, the posture of the vehicle during the turning thereof can further be stabilized.

BRIEF DESCRIPTION OF DRAWINGS

Various other objects, features and many of the attendant advantages of the present invention will be readily appreciated as the same becomes better understood by reference to the following detailed description of the preferred embodiment when considered in connection with the accompanying drawings, in which.

BEST MODE FOR CARRYING OUT OF THE INVENTION

First Embodiment

Figure 1:
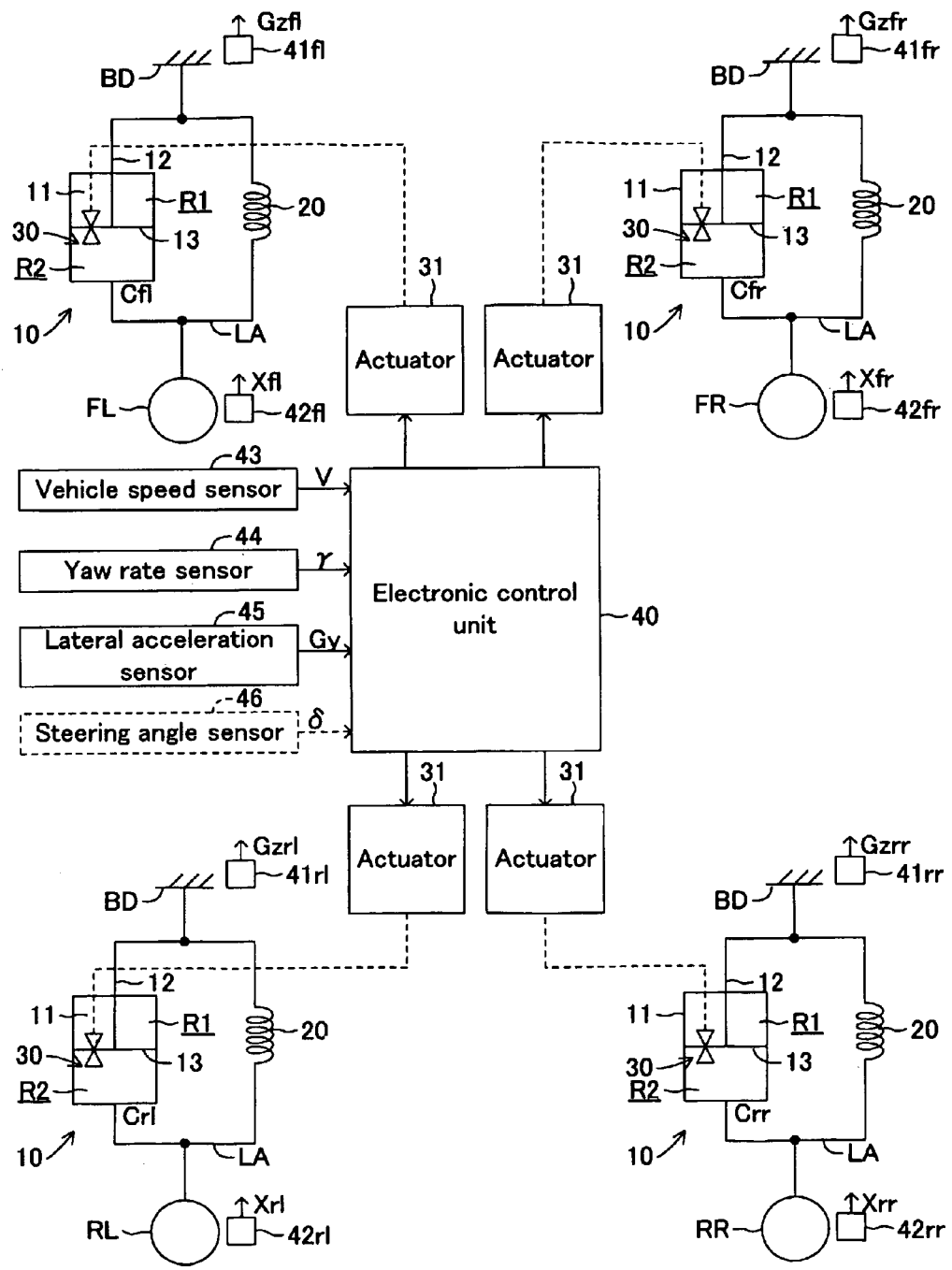
FIG. 1 is a schematic diagram showing an overall of a vehicle damping force control apparatus according to a first embodiment, its modified example, and a second embodiment of the present invention.

A first embodiment according to the present invention will be explained hereinafter with reference to the drawings. FIG. 1 is a schematic diagram showing an overall of a vehicle damping force control apparatus according to the first embodiment. This damping force control apparatus has shock absorbers 10 and springs 20 between a vehicle body BD (sprung member) and the respective front left wheel FL, front right wheel FR, rear left wheel RL and rear right wheel RR.

Each of the shock absorbers 10 is disposed between an unsprung member LA that functions as a suspension system composed of a lower arm and knuckle connected to each of the front left wheel FL, front right wheel FR, rear left wheel RL and rear right wheel RR and the vehicle body BD (sprung member). It is coupled to the unsprung member LA at the lower end of a cylinder 11 and fixed to the vehicle body BD at the upper end of a piston rod 12 that is inserted into the cylinder 11 so as to be capable of moving up and down. The coil spring 20 is provided in parallel to the shock absorber 10. The cylinder 11 is divided into an upper chamber R1 and a lower chamber R2 by the piston 13 that slides on its inner peripheral surface in a liquid-tight manner.

A variable throttle mechanism 30 is disposed to the piston 13. The variable throttle mechanism 30 changes the opening of a communication path, that communicates the upper chamber R1 and the lower chamber R2 in the cylinder 11 with each other, in plural stages by the operation of an actuator 31 composing a part thereof. When the opening of the communication path is increased in accordance with the changeover stage, the damping force of the shock absorber 10 is set to a soft-side, while when the opening of the communication path is decreased, the damping force of the shock absorber 10 is set to a hard-side. The damping coefficient of each shock absorber 10 is indicated by Cfl, Cfr, Crl and Crr corresponding to the front left wheel FL, front right wheel FR, rear left wheel RL and rear right wheel RR.

Subsequently, an electronic control apparatus for controlling the operation of the actuator 31 will be explained. The electronic control apparatus has an electronic control unit 40. The electronic control unit 40 is a microcomputer which includes a CPU, ROM, RAM, or the like. It repeatedly executes a roll and pitching suppression control program shown in FIG. 3 every time a predetermined time elapses after an ignition switch is turned on, thereby controlling the operation of the actuator 31. Connected to this electronic control unit 40 are sprung acceleration sensors 41fl, 41fr, 41rl and 41rr, height sensors 42fl, 42fr, 42rl and 42rr, vehicle speed sensor 43, yaw rate sensor 44, and lateral acceleration sensor 45.

The sprung acceleration sensors 41fl, 41fr, 41rl and 41rr are disposed to the vehicle body BD corresponding to the front left wheel FL, front right wheel FR, rear left wheel RL and rear right wheel RR. They respectively detect sprung accelerations Gzfl, Gzfr, Gzrl and Gzrr in the vertical direction with respect to an absolute space of the vehicle body BD at the disposed position. The sprung accelerations Gzfl, Gzfr, Gzrl and Gzrr detected by the sprung acceleration sensors 41fl to 41rr represent that the upward acceleration is generated to the vehicle when the value thereof is positive, and represent that the downward acceleration is generated to the vehicle when the value thereof is negative. The height sensors 42fl, 42fr, 42rl and 42rr are provided between the unsprung member LA corresponding to the front left wheel FL, front right wheel FR, rear left wheel RL and rear right wheel RR and the vehicle body BD for detecting the relative displacements (strokes) Xfl, Xfr, Xrl and Xrr of the front left wheel FL, front right wheel FR, rear left wheel RL and rear right wheel RR to the vehicle body BD. The strokes Xfl, Xfr, Xrl and Xrr detected by the height sensors 42fl to 42rr represent the direction in which the space between the unsprung member LA and the vehicle body BD is reduced when the value thereof is positive, while represent the direction in which the same space is increased when the value thereof is negative.

The vehicle speed sensor 43 detects a vehicle speed V. The yaw rate sensor 44 detects a yaw rate γ. The yaw rate γ detected by the yaw rate sensor 44 represents that a counterclockwise angular velocity is generated about an axis in the vertical direction of the vehicle passing through the center of gravity of the vehicle when the value thereof is positive, while represents that a clockwise angular velocity is generated about the axis when the value thereof is negative. The lateral acceleration sensor 45 detects a lateral acceleration Gy in the side-to-side direction of the vehicle. The lateral acceleration Gy detected by the lateral acceleration sensor 45 represents that the acceleration in the rightward direction is generated on the vehicle when the value thereof is positive, while represents that the acceleration in the leftward direction is generated on the vehicle when the value thereof is negative.

Figure 2:
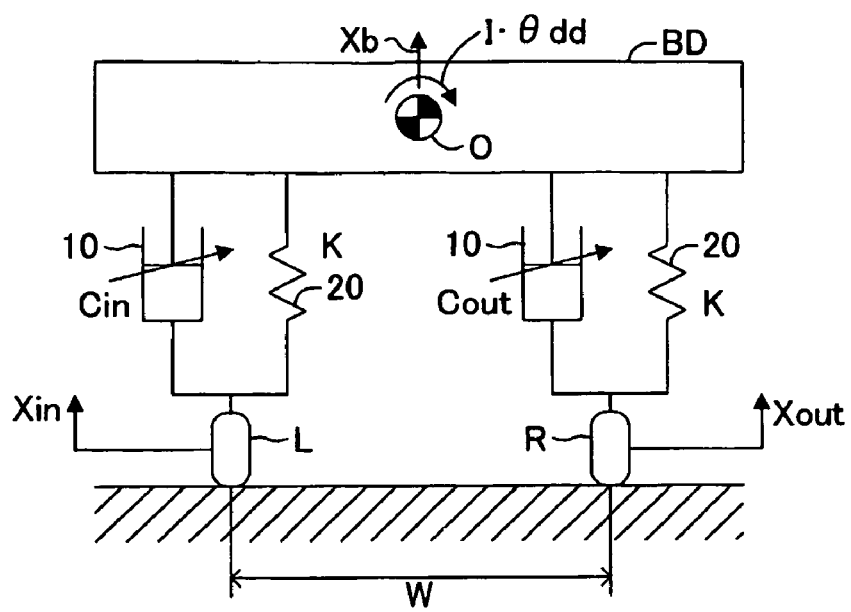
FIG. 2(A) is an explanatory view for showing a motion of a suspension system by using a vehicle model that represents left and right wheels of an actual vehicle.
FIG. 2(B) is an explanatory view for showing a motion of a suspension system by using a virtual vehicle model that represents left and right wheels of a virtual vehicle.
Figure 2:
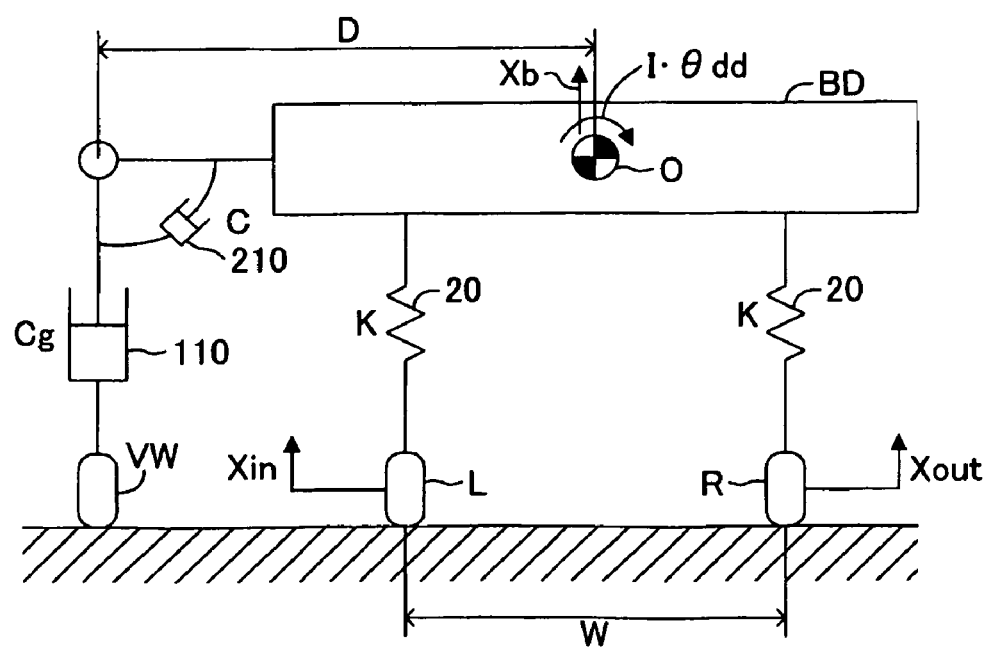

Before explaining the operation of the vehicle damping force control apparatus according to the first embodiment of the present invention, an outline of a motion of a suspension system will be explained by using a two-wheel model shown in FIG. 2. FIG. 2(A) is a vehicle model indicating left and right wheels of an actual vehicle. In this actual vehicle model, shock absorbers 10 and coil springs 20 are disposed respectively between the vehicle body BD and the left wheel L and between the vehicle body BD and the right wheel R.

On the other hand, FIG. 2(B) is a vehicle model indicating left and right wheels of a virtual vehicle. In this virtual vehicle model, only coil springs 20 are disposed respectively between the vehicle body. BD and the left wheel L and between the vehicle body BD and the right wheel R, and further, a lift-suppression-use shock absorber 110 for suppressing a lift of the vehicle body BD and a roll-suppression-use shock absorber 210 for suppressing a roll of the vehicle body BD during the turning of the vehicle are provided between the virtual vehicle wheel VW running on a virtual position at the inner side of the turning locus and the vehicle body BD.

The virtual vehicle model can suppress the increase in the height at the side of the inner wheel of the turning locus (corresponding to the left wheel L in FIG. 2(B)) during the roll of the vehicle body BD. Therefore, by adapting the virtual vehicle model to the actual vehicle model shown in FIG. 2(A), the increase in the center of gravity O of the actual vehicle model during the roll of the vehicle body BD is suppressed, so that driveability can be enhanced.

It is supposed, for example, that the actual vehicle model shown in FIG. 2(A) turns in the leftward direction. It is supposed here that the mass of the vehicle body BD is defined as M, the spring constant of the coil spring 20 is defined as K, the damping coefficient of the shock absorber 10 at the inner wheel of the turning locus (left wheel L) is defined as Cin, and the damping coefficient of the shock absorber 10 at the outer wheel of the turning locus (right wheel R) is defined as Cout. Further, the displacement amount and acceleration in the vertical direction in the absolute space of the vehicle body BD are supposed to be defined as Xb and Xbdd, the stroke and stroke speed of the inner wheel (left wheel L) of the turning locus are supposed to be respectively defined as Xin and Xind, and the stroke and stroke speed of the outer wheel (right wheel R) of the turning locus are supposed to be respectively defined as Xout and Xoutd, whereby the equation of motion of the vehicle body BD in the vertical direction is represented by the following equation 1.

$$M \cdot Xbdd = K \cdot Xin + K \cdot Xout + Cin \cdot Xind + Cout \cdot Xoutd \quad (1)$$

If the roll inertia moment of the vehicle is defined as I, the wheel treads of the left and right wheels L and R are defined as W, and the angular acceleration velocity about the axis in the longitudinal direction of the vehicle passing the center of gravity O of the vehicle is defined as θdd, the equation of motion about the axis in the longitudinal direction of the vehicle passing the center of gravity O of the vehicle is represented by the following equation (2).

$$I \cdot \theta dd = W \cdot (K \cdot Xin - K \cdot Xout + Cin \cdot Xind - Cout \cdot Xoutd)/2 \quad (2)$$

On the other hand, if the damping coefficient of the lift-suppression-use shock absorber 110 is defined as Cg, the damping coefficient of the roll-suppression-use shock absorber 210 is defined as C, and the distance between the center of gravity O of the vehicle and the lift-suppression-use shock absorber 110 is defined as D in the virtual vehicle model shown in FIG. 2(B), the equation of motion of the vehicle body BD in the vertical direction during the turning of the vehicle in the leftward direction and the equation of motion about the axis in the longitudinal direction of the vehicle body passing the center of gravity O of the vehicle are respectively represented by the following equations (3) to (5).

$$M \cdot Xbdd = K \cdot Xin + K \cdot Xout + T \quad (3)$$

$$I \cdot \theta dd = W \cdot (K \cdot Xin - K \cdot Xout + C \cdot Xind - C \cdot Xoutd)/2 + D \cdot T \quad (4)$$

wherein $T = Cg \cdot Xind \cdot (W+2D)/(2W) + Cg \cdot Xoutd \cdot (W-2D)/(2W)$ (5)

The following equation (6) is established from the equations (1) to (3).

$$Cin \cdot Xind + Cout \cdot Xoutd = T \quad (6)$$

Further, the following equation (7) is established from the equations (2) to (4).

$$Cin \cdot Xind - Cout \cdot Xoutd = C \cdot Xind - C \cdot Xoutd + 2D \cdot T/W \quad (7)$$

Both sides of the equations (6) and (7) are added, whereby the damping coefficient Cin of the shock absorber 10 at the inner wheel (left wheel L) of the turning locus during the roll is represented by using the following equation (8).

$$Cin = T \cdot (W+2D)/(2W \cdot Xind) + C \cdot (1 - Xoutd/Xind)/2 \quad (8)$$

Similarly, both sides of the equations (6) and (7) are subtracted, whereby the damping coefficient Cout of the shock absorber 10 at the outer wheel (right wheel R) of the turning locus during the roll is represented by using the following equation (9).

$$Cout = T \cdot (W-2D)/(2W \cdot Xoutd) + C \cdot (1 - Xind/Xoutd)/2 \quad (9)$$

By using the equations (8) and (9), the damping force generated by the shock absorber 10 at the inner wheel (left wheel L) of the turning locus during the roll and the damping force generated by the shock absorber 10 at the outer wheel (right wheel R) of the turning locus during the roll are respectively represented by the following equations (10) and (11).

$$\begin{aligned} Fin &= Cin \cdot Xind \\ &= T \cdot (W+2D)/(2W) + C \cdot (Xind - Xoutd)/2 \end{aligned} \quad (10)$$

$$\begin{aligned} Fout &= Cout \cdot Xoutd \\ &= T \cdot (W-2D)/(2W) + C \cdot (Xoutd - Xind)/2 \end{aligned} \quad (11)$$

The two-wheel vehicle model of the left and right wheels explained above is adapted to the front wheel and the rear wheel of the actual vehicle, whereby the damping coefficients Cfin, Cfout, Crin, and Crout of the shock absorbers 10 each corresponding to the front wheel at the inner side of the turning locus, the front wheel at the outer side of the turning locus, the rear wheel at the inner side of the turning locus, and the rear wheel at the outer side of the turning locus, during the roll, are respectively represented by the following equations (12) to (15). Here, the stroke speeds of the front wheel at the inner side of the turning locus, the front wheel at the outer side of the turning locus, the rear wheel at the inner side of the turning locus, and the rear wheel at the outer side of the turning locus are supposed to be defined as Xfind, Xfoutd, Xrind, and Xroutd. Further, the distance between the center of gravity of the vehicle at the front wheel side and the lift-suppression-use shock absorber arranged at the front wheel side is supposed to be defined as Df, the distance between the center of gravity of the vehicle at the rear wheel side and the lift-suppression-use shock absorber arranged at the rear wheel side is supposed to be defined as Dr, the wheel tread of the front wheel is supposed to be defined as Wf, and the wheel tread of the rear wheel is supposed to be defined as Wr. Moreover, it is supposed that the damping coefficient of the roll-suppression-use shock absorber arranged at the front wheel side is defined as Cf, and the damping coefficient of the roll-suppression-use shock absorber arranged at the rear wheel side is defined as Cr.

$$Cfin = Tf \cdot (Wf+2Df)/(2Wf \cdot Xfind) + Cf \cdot (1 - Xfoutd/Xfind)/2 \quad (12)$$

$$Cfout = Tf \cdot (Wf-2Df)/(2Wf \cdot Xfoutd) + Cf \cdot (1 - Xfind/Xfoutd)/2 \quad (13)$$

$$Crin = Tr \cdot (Wr+2Dr)/(2Wr \cdot Xrind) + Cr \cdot (1 - Xroutd/Xrind)/2 \quad (14)$$

$$Crout = Tr \cdot (Wr-2Dr)/(2Wr \cdot Xroutd) + Cr \cdot (1 - Xrind/Xroutd)/2 \quad (15)$$

wherein Tf represents a total of the damping forces generated by the front-wheel-side shock absorbers 10, and Tr represents a total of the damping forces generated by the rear-wheel-side shock absorbers 10, both of which are respectively represented by the following equations (16) and (17).

$$Tf = Cgf \cdot Xfind \cdot (Wf+2Df)/(2Wf) + Cgf \cdot Xfoutd \cdot (Wf-2Df)/(2Wf) \quad (16)$$

$$Tr = Cgr \cdot Xrind \cdot (Wr+2Dr)/(2Wr) + Cgr \cdot Xroutd \cdot (Wr-2Dr)/(2Wr) \quad (17)$$

Here, Cgf represents the damping coefficient of the lift-suppression-use shock absorber arranged at the front-wheel-side, while Cgr represents the damping coefficient of the lift-suppression-use shock absorber arranged at the rear-wheel-side.

Subsequently, the operation of the first embodiment thus configured will be explained. A driver operates the ignition key to turn on the ignition switch, the electronic control unit 40 starts to repeatedly execute the roll and pitching suppression control program shown in FIG. 3 every time a predetermined short period elapses.

The roll and pitching suppression control program is started from step S10, and after that, the processes at steps S11 to S15 are repeatedly executed. At first, the processes at steps S11 to S14 will briefly be explained.

Figure 4:
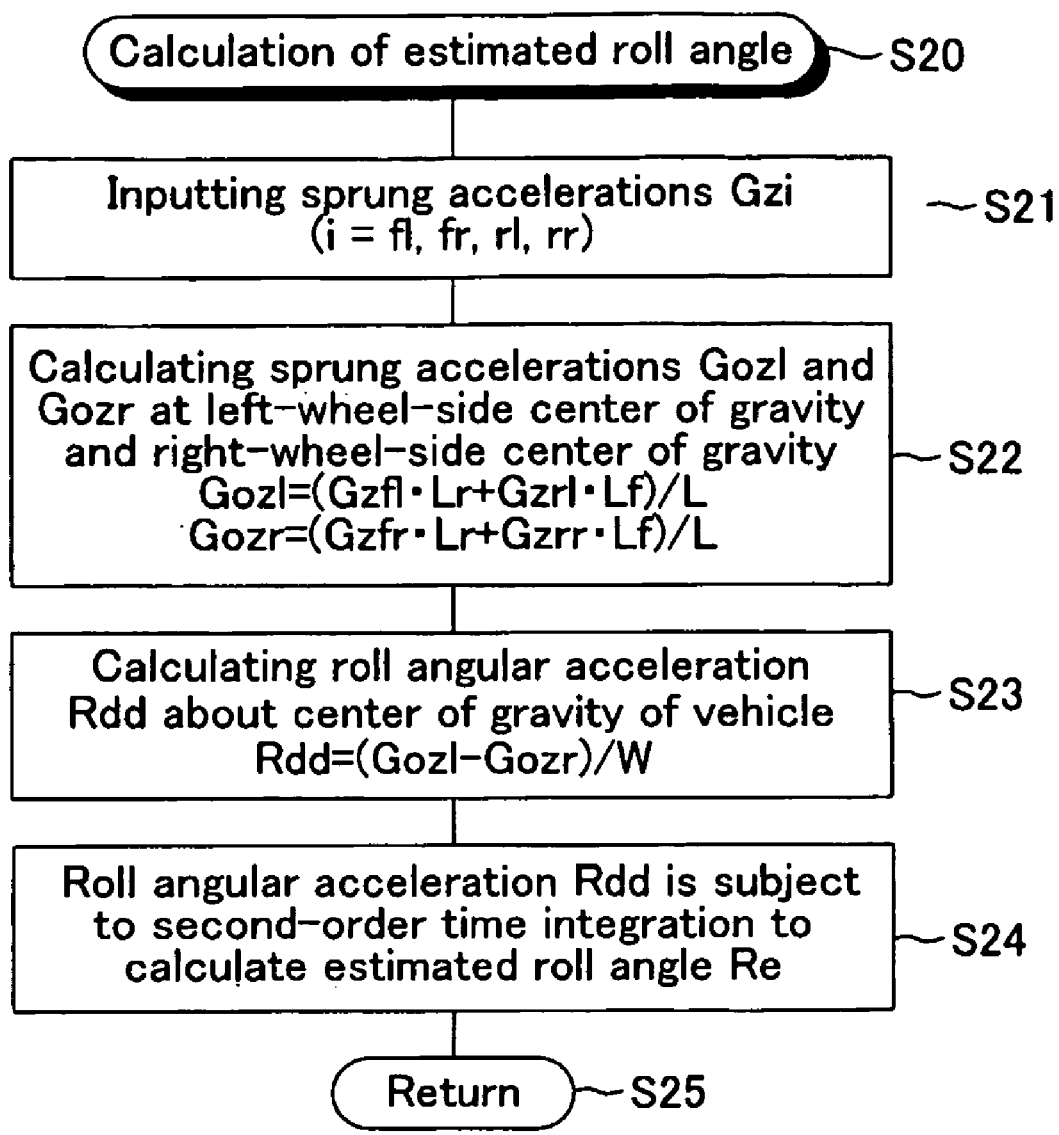
FIG. 4 is a flowchart showing an estimated roll angle calculation program executed by the electronic control unit shown in FIG. 1 according to the first embodiment and its modified example of the present invention.
Figure 5:
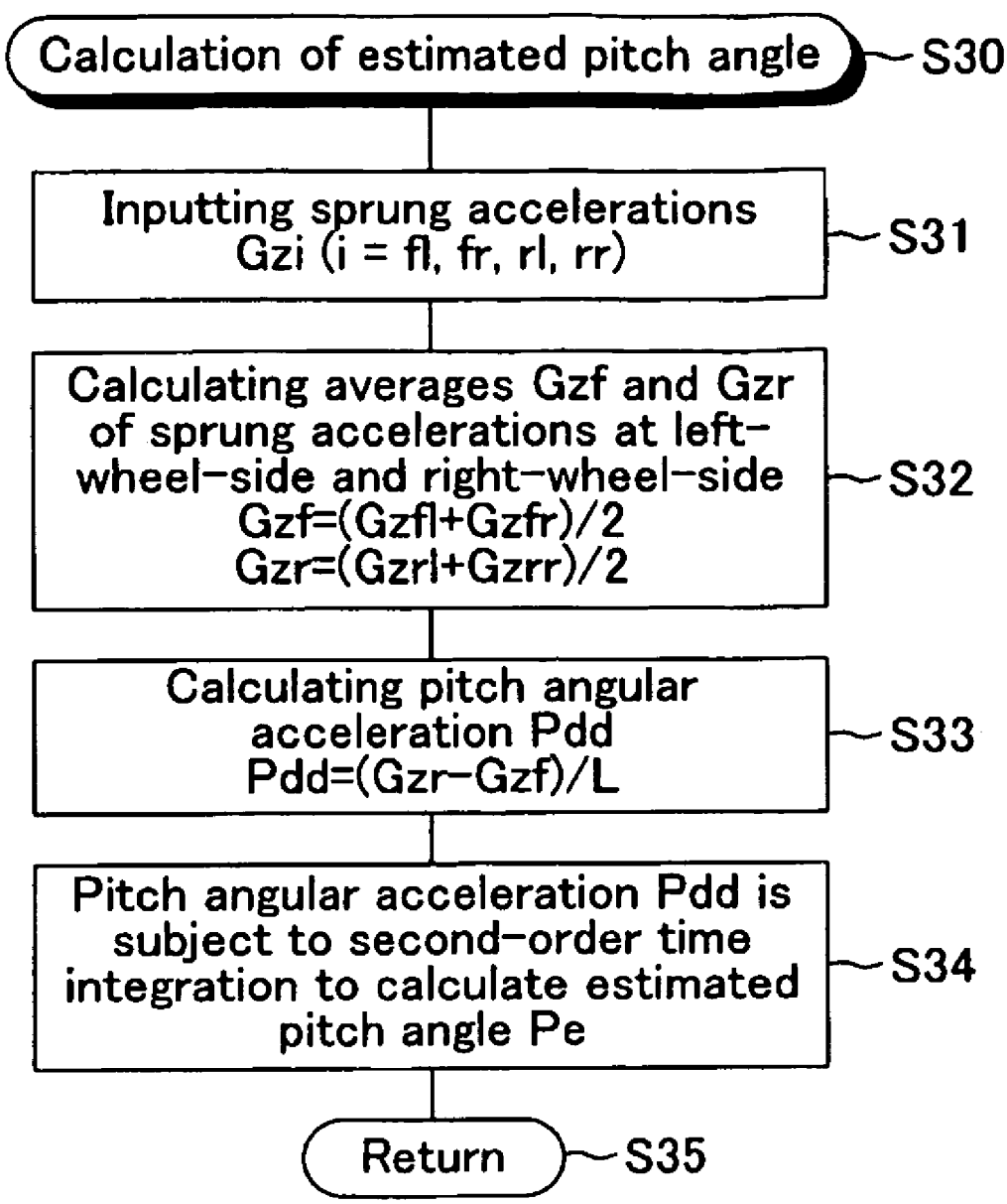
FIG. 5 is a flowchart showing an estimated pitch angle calculation program executed by the electronic control unit shown in FIG. 1 according to the first embodiment and its modified example of the present invention.

At step S11, a vehicle angle, i.e., an estimated roll angle and estimated pitch angle of the vehicle body BD, during the turning of the vehicle, is calculated (see FIGS. 4 and 5). At step S12, a front-wheel-side target damping force, which is the total of the damping forces of each shock absorber 10 arranged so as to correspond to the front wheels FL and FR, is determined (see FIG. 6) by using the estimated roll angle and the estimated pitch angle of the vehicle body BD calculated at step S11. At step S13, a rear-wheel-side target damping force, which is the total of the damping forces of each shock absorber 10 arranged so as to correspond to the rear wheels RL and RR, is determined (see FIG. 7).

Figure 8:
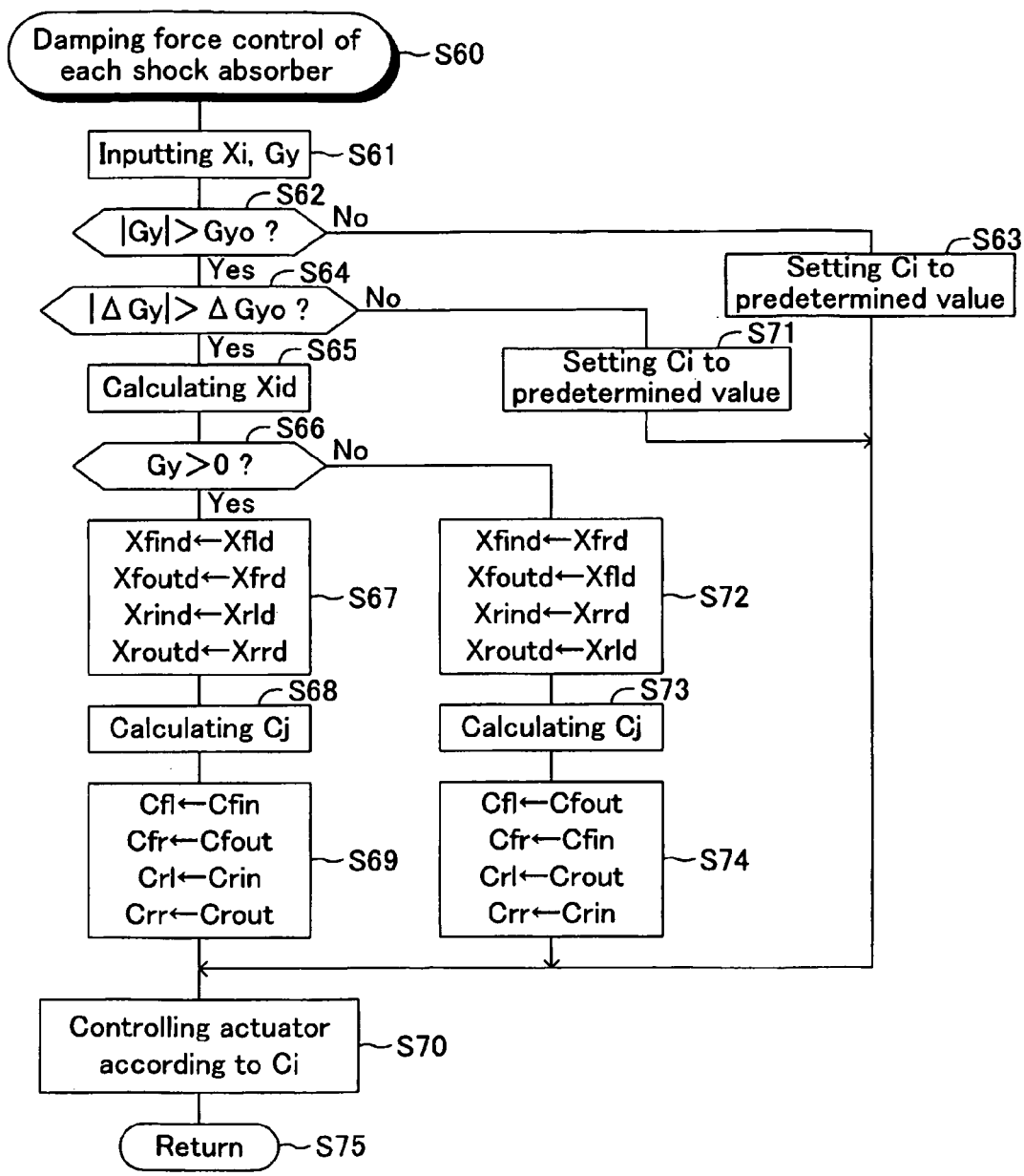
FIG. 8 is a flowchart showing an each shock absorber damping force control program executed by the electronic control unit shown in FIG. 1 according to the first embodiment, its modified example, and the second embodiment of the present invention.

At step S14, the damping coefficient of each shock absorber 10, which is arranged so as to correspond to each of the front left wheel FL, front right wheel FR, rear left wheel RL and rear right wheel RR, is calculated by using the front-wheel-side target damping force determined at step S12 and the rear-wheel-side target damping force determined at step S13, in order to control the operation of each actuator 31 in accordance with the calculated damping coefficient (see FIG. 8). After the process at step S14, the execution of the roll and pitching suppression control program is ended at step S15.

Subsequently, the processes at steps S11 to S14 will be specifically explained. The estimated roll angle calculation program shown in FIG. 4 and the estimated pitch angle calculation program shown in FIG. 5 are executed in the calculation of the vehicle angle at step S11. The estimated roll angle calculation program will firstly be explained with reference to FIG. 4.

The execution of the estimated roll angle calculation program is started from step S20. At step S21, the sprung accelerations Gzfl, Gzfr, Gzrl and Gzrr detected by the sprung acceleration sensors 41*fl*, 41*fr*, 41*rl* and 41*rr* are respectively inputted. At step S22, the sprung accelerations Gozl and Gozr at the center of gravity of the left-wheel-side vehicle body and the same of the right-wheel-side vehicle body are calculated by using the following equations (18) and (19).

$$Gozl = (Gzfl \cdot Lr + Gzrl \cdot Lf)/L \quad (18)$$

$$Gozr = (Gzfr \cdot Lr + Gzrr \cdot Lf)/L \quad (19)$$

Here, L represents a wheel base of the vehicle, and Lf and Lr respectively represent the distance between the center of gravity of the vehicle and the front axle and between the center of gravity of the vehicle and the rear axle.

At step S23, the roll angular acceleration Rdd about the axis in the longitudinal direction of the vehicle passing the center of gravity of the vehicle is calculated by using the following equation (20).

$$Rdd = (Gozl - Gozr)/W \quad (20)$$

Here, W represents a wheel tread. At step S24, the roll angular acceleration Rdd calculated by using the equation (20) is subject to second-order time integration to thereby calculate the estimated roll angle Re. The estimated roll angle Re represents that the vehicle body BD rolls in the rightward direction when the value thereof is positive, and that the vehicle body BD rolls in the leftward direction when the value thereof is negative. After the process at step S24, the execution of the estimated roll angle calculation program is temporarily ended at step S25.

Subsequently, the estimated pitch angle calculation program will be explained with reference to FIG. 5. The execution of the estimated pitch angle calculation program is started from step S30. At step S31, the sprung accelerations Gzfl, Gzfr, Gzrl and Gzrr detected by the sprung acceleration sensors 41*fl*, 41*fr*, 41*rl* and 41*rr* are respectively inputted. At step S32, the average Gzf and Gzr of the sprung accelerations at the front-wheel-side vehicle body and the rear-wheel-side vehicle body are calculated by using the following equations (21) and (22).

$$Gzf = (Gzfl + Gzfr)/2 \quad (21)$$

$$Gzr = (Gzrl + Gzrr)/2 \quad (22)$$

At step S33, the pitch angular acceleration Pdd of the vehicle is calculated by using the following equation (23).

$$Pdd = (Gzr - Gzf)/L \quad (23)$$

Here, L represents the wheel base of the vehicle, like the above-mentioned equations (18) and (19). At step S34, the pitch angular acceleration Pdd calculated by using the equation (23) is subject to second-order time integration to thereby calculate the estimated pitch angle Pe. The estimated pitch angle Pe represents that the vehicle body BD is in a forward tilting posture when the value thereof is positive. It should be noted that, during the turning of the vehicle, the estimated pitch angle Pe becomes always positive according to a vehicle structure. After the process at step S34, the execution of the estimated pitch angle calculation program is temporarily ended at step S35.

Figure 3:
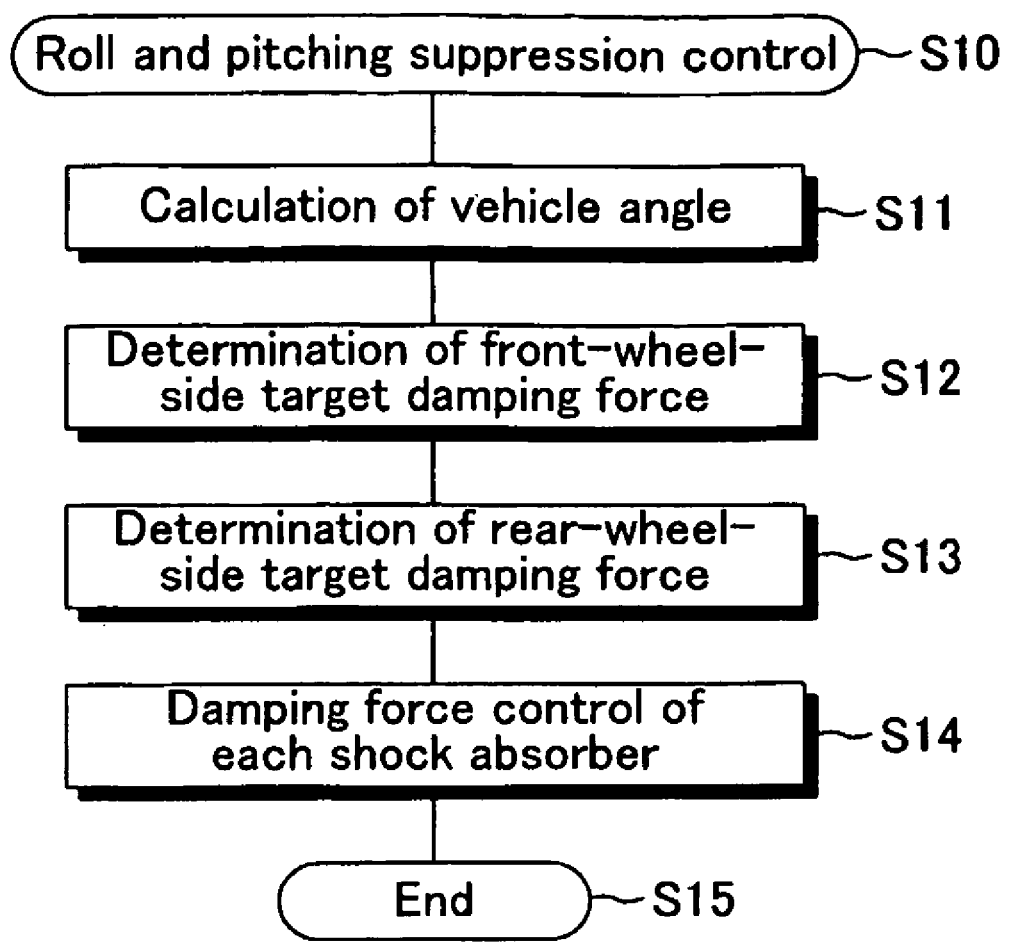
FIG. 3 is a flowchart showing a roll and pitching suppression control program executed by the electronic control unit shown in FIG. 1 according to the first embodiment, its modified example, and the second embodiment of the present invention.

Referring back to the roll and pitching suppression control program shown in FIG. 3, the determination of the front-wheel-side target damping force at step S12 will subsequently be explained. The determination of the front-wheel-side target damping force is for calculating the damping force required for the front-wheel-side shock absorber 10 in order to suppress the pitching generated on the vehicle body BD during the roll, and for setting the calculated damping force as the front-wheel-side target damping force. Specifically, the electronic control unit 40 executes a front-wheel-side target damping force determination program shown in FIG. 6.

Figure 9:
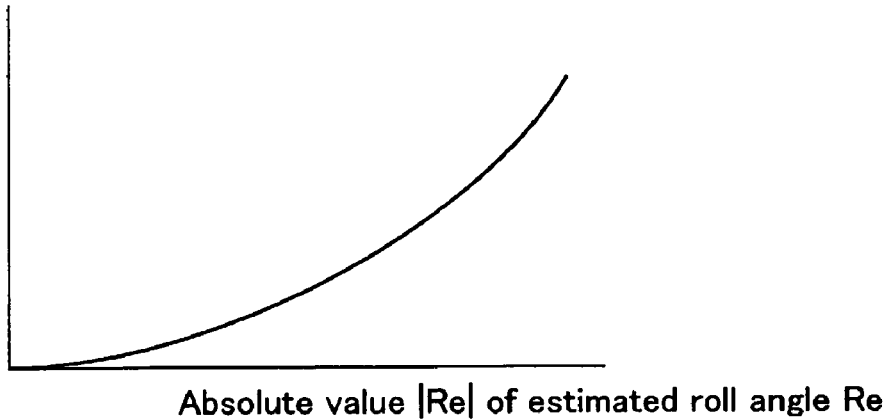
FIG. 9 is a graph showing a change characteristic of a target pitch angle to an estimated roll angle stored in the target pitch angle table formed in the electronic control unit according to the first embodiment of the present invention.

The execution of the front-wheel-side target damping force determination program is started from S40. At step S41, a target pitch angle is calculated by using the estimated roll angle Re obtained by the execution of the above-mentioned estimated roll angle calculation program. In the calculation of the target pitch angle, a target pitch angle table formed in the ROM in the electronic control unit 40 is referred to for calculating the target pitch angle Pt of the vehicle body BD that changes in accordance with the absolute value |Re| of the estimated roll angle Re. The pitch angle table stores the target pitch angle Pt by which the vehicle takes a slightly forward-bent posture during the turning of the vehicle as shown in FIG. 9. This target pitch angle Pt is unambiguously determined in accordance with the estimated roll angle Re, and has a feature of non-linearly increasing in accordance with the increase in the estimated roll angle Re. The target pitch angle Pt takes, for example, not more than 0.1 degree. Instead of or in addition to the use of the target pitch angle table, the target pitch angle Pt changing in accordance with the estimated roll angle Re is defined beforehand by a function, and the target pitch angle Pt may be calculated by using the function.

After the process at step S41, the estimated pitch angle Pe is subtracted from the target pitch angle Pt to calculate a corrected pitch angle $\Delta P$ ($\Delta P = Pt - Pe$) at step S42. Then, at step S43, the corrected pitch angle $\Delta P$ is subject to second-order time differentiation to calculate the corrected pitch angular acceleration Pdd ($Pdd = d^2(\Delta P)/dt^2$).

At step S44, a corrected pitch moment Pm required for the correction of the pitch angle is calculated by using the following equation (24).

$$Pm = I \cdot Pdd + Kp \cdot \Delta P \quad (24)$$

Here, I represents an inertia moment about the axis in the side-to-side direction of the vehicle passing the center of gravity of the vehicle, and Kp represents a spring coefficient considering a pitch rigidity.

At step S45, the corrected pitch moment Pm is divided by the distance Lf between the center of gravity of the vehicle and the front axle, and converts the resultant into the force in the vertical direction exerted on the front-wheel-side vehicle body ($\Delta Tf = Pm/Lf$). At step S46, the front-wheel-side target damping force Tf* is set to ($Tf + \Delta Tf$). Here, Tf is the total of the damping forces currently set at the front-wheel-side shock absorbers 10 (see equation (16)). At step S47, the front-wheel-side target damping force Tf* (=($Tf + \Delta Tf$)) is set as the total Tf of the damping forces of the front-wheel-side shock absorbers 10 used in the aforesaid equations (12) and (13). After the process at step S47, the execution of the front-wheel-side target damping force determination program is ended at step S48.

Returning back to the roll and pitch suppression control program shown in FIG. 3, the determination of the rear-wheel-side target damping force at step S13 will subsequently be explained. The determination of the rear-wheel-side target damping force is for calculating the damping force required for the rear-wheel-side shock absorber 10 in order to suppress the pitching generated on the vehicle body BD during the roll, and for setting the calculated damping force as the rear-wheel-side target damping force. Specifically, the electronic control unit 40 executes a rear-wheel-side target damping force determination program shown in FIG. 7.

The execution of the rear-wheel-side target damping force determination program is started from S50. At step S51, the vehicle speed V detected by the vehicle speed sensor 43, the yaw rate γ detected by the yaw rate sensor 44, and the lateral acceleration Gy detected by the lateral acceleration sensor 45 are inputted. At step S52, the slip angular velocity of the center of gravity of the vehicle dβ/dt is calculated from the equation of motion of the vehicle in the side-to-side direction at the center of gravity of the vehicle, when the slip angle at the center of gravity of the vehicle is defined as p, with the use of the following equation (25).

$$d\beta/dt=(Gy/V)-\gamma \quad (25)$$

Subsequently, the slip angular velocity at the center of gravity of the vehicle dβ/dt calculated at step S52 is time-integrated at step S53 to calculate the slip angle β at the center of gravity of the vehicle. At step S54, the rear-wheel slip angle θr is calculated with the use of the following equation (26), considering that the rear wheel has speed component at the center of gravity of the vehicle and a speed component due to the rotation about the center of gravity of the vehicle.

$$\theta r=(\gamma \cdot Lr/V)-\beta \quad (26)$$

Here, Lr represents the distance between the center of gravity of the vehicle and the rear axle.

At step S55, rear-wheel estimated lateral force Yr is calculated on the basis of the following equation (27) with the use of the rear-wheel slip angle θr calculated at step S54.

$$Yr=Cr \cdot \theta r/(TrS+1) \quad (27)$$

Here, Cr represents a cornering power, i.e., a cornering force of the rear wheel per unit slip angle within the area of the slip angle in which the cornering force produced on the rear wheel increases generally in proportion to the slip angle. Tr represents a time constant of the tire composing the rear wheel. It is set by considering the delay time of the lateral force generated with the delay from the elastic deformation of the tire.

At step S56, estimated jack-up force Jr applied to the rear-wheel-side vehicle body is calculated on the basis of the following equation (28) by using the rear-wheel estimated lateral force Yr calculated at step S55.

$$Jr=Kjr \cdot Yr^2 \quad (28)$$

Here, Kjr represents a jack-up coefficient considering the geometry change of the rear-wheel-side unsprung member LA.

At step S57, the rear-wheel-side target damping force Tr* is set to force (−Jr) that is opposite to the rear-wheel-side estimated jack-up force Jr. At step S58, the rear-wheel-side target damping force Tr* (=−Jr) is set as the total Tr of the damping forces generated by the rear-wheel-side shock absorbers 10 used in the above-mentioned equations (14) and (15). After the process at step S58, the execution of the rear-wheel-side target damping force determination program is ended at step S59.

Returning back to the roll and pitching suppression control program shown in FIG. 3, the damping force control of each shock absorber 10 at step S14 will subsequently be explained. The damping force control of each shock absorber is for suppressing the rise of the center of gravity of the vehicle, while suppressing the roll of the vehicle body BD during the turning of the vehicle, by adapting the aforesaid virtual vehicle model (see FIG. 2(B)) to the actual vehicle model (see FIG. 2(A)). Specifically, the electronic control unit 40 executes each shock absorber damping force control program shown in FIG. 8.

The execution of the each shock absorber damping force control program is started from step S60. At step S61, strokes Xi (i=fl, fr, rl, rr) of the front left wheel FL, front right wheel FR, rear left wheel RL and rear right wheel RR to the vehicle body BD detected by the height sensors 42fl, 42fr, 42rl and 42rr are respectively inputted. Further, the lateral acceleration Gy of the vehicle detected by the lateral acceleration sensor 45 is inputted, and then, the program proceeds to step S62.

At step S62, it is determined whether the absolute value |Gy| of the lateral acceleration Gy is greater than the predetermined threshold value Gyo or not, i.e., whether the damping force control of each shock absorber 10 is necessary or not. Firstly explained is the case in which the vehicle is running straight. In this case, the magnitude of the lateral acceleration Gy is generally "0", so that a "No" determination is made at step S62. Then, the damping coefficients Ci (i=fl, fr, rl, rr) of each shock absorber 10 are set to a predetermined value (e.g., soft-side damping coefficient), which is set beforehand, suitable for the straight running. After the process at step S63, the operation of the corresponding actuator 31 is controlled at step S70 in accordance with the damping coefficients Ci (i=fl, fr, rl, rr) set to the above-mentioned predetermined value. After the process at step S70, the execution of the each shock absorber damping force control program is temporarily ended at step S75.

Subsequently explained is the case in which the vehicle starts to turn in the leftward direction. In this case, when a "Yes" determination is made, i.e., when it is determined that the absolute value |Gy| of the lateral acceleration Gy is greater than the predetermined threshold value Gyo at step S62, the lateral acceleration Gy is time-differentiated at step S64 to calculate the differentiated value ΔGy, and then, it is determined whether the absolute value |ΔGy| of the differentiated value ΔGy is greater than the predetermined threshold value ΔGyo or not, i.e., whether the roll angle of the vehicle body BD is in the increasing process or decreasing process. Since the vehicle is turning in the leftward direction and the roll angle of the vehicle body BD is increasing, a "Yes" determination is made at step S64, i.e., it is determined that the absolute value |ΔGy| of the differentiated value ΔGy is greater than the predetermined threshold value ΔGyo at step S64, and then, the program proceeds to step S65.

At step S65, each of strokes Xi (i=fl, fr, rl, rr) of the front left wheel FL, front right wheel FR, rear left wheel RL and rear right wheel RR to the vehicle body BD is time-differentiated to calculate stroke speeds Xid (i=fl, fr, rl, rr). Then, it is determined at step S66 whether the lateral acceleration Gy is positive or not. Since the vehicle is turning in the leftward direction, a "Yes" determination is made at step S66, and then, the processes after Step S67 are executed.

At step S67, the stroke speed Xfld of the front left wheel FL is set as the stroke speed Xfind of the front wheel at the inner side of the turning locus, the stroke speed Xfrd of the front right wheel FR is set as the stroke speed Xfoutd of the front wheel at the outer side of the turning locus, the stroke speed Xrld of the rear left wheel RL is set as the stroke speed Xrind of the rear wheel at the inner side of the turning locus, and the stroke speed Xrrd of the rear right wheel RR is set as the stroke speed Xroutd of the rear wheel at the outer side of the turning locus.

At step S68, the damping coefficients Cj (j=fin, fout, rin, rout) of the shock absorbers 10 each corresponding to the front wheel at the inner side of the turning locus, front wheel at the outer side of the turning locus, rear wheel at the inner side of the turning locus, and the rear wheel at the outer side of the turning locus, are calculated on the basis of the aforesaid equations (12) to (15). In this case, Tf used in the aforesaid equations (12) and (13) is set to the front-wheel-side target damping force Tf* by the execution of the front-wheel-side target damping force determination program shown in FIG. 6, and Tr used in the aforesaid equations (14) and (15) is set to the rear-wheel-side target damping force Tr* by the execution of the rear-wheel-side target damping force determination program shown in FIG. 7.

At step S69, the damping coefficient Cfin of the shock absorber 10 at the front wheel at the inner side of the turning locus is set as the damping coefficient Cfl of the shock absorber 10 at the front left wheel FL, the damping coefficient Cfout of the shock absorber 10 at the front wheel at the outer side of the turning locus is set as the damping coefficient Cfr of the shock absorber 10 at the front right wheel FR, the damping coefficient Crin of the shock absorber 10 at the rear wheel at the inner side of the turning locus is set as the damping coefficient Crl of the shock absorber 10 at the rear left wheel RL, and the damping coefficient Crout of the shock absorber 10 at the rear wheel at the outer side of the turning locus is set as the damping coefficient Crr of the shock absorber 10 at the rear right wheel RR.

Then, at step S70, the operation of the corresponding actuator 31 is controlled at step S70 in accordance with the damping coefficients Ci (i=fl, fr, rl, rr) set at step S69. After the process at step S70, the execution of the each shock absorber damping force control program is temporarily ended at step S75. After that, the processes at steps S60 to S62, at steps S64 to S70, and at step S75 are repeatedly executed during when the roll angle of the vehicle body BD increases.

When the roll angle of the vehicle body BD reaches generally the greatest value from this state and the increase of the roll angle is stopped, a "No" determination is made at step S64, i.e., it is determined that the absolute value |ΔGy| of the differentiated value ΔGy of the lateral acceleration Gy is smaller than the predetermined threshold value ΔGyo at step S64, so that each damping coefficient Ci (i=fl, fr, rl, rr) of each shock absorber 10 is set at step S71 to the predetermined value (e.g., hard-side damping coefficient), which is set beforehand, suitable for the turning. After the process at step S71, the operation of the corresponding actuator 31 is controlled at step S70 in accordance with the damping coefficients Ci (i=fl, fr, rl, rr) set to the predetermined value. After the process at step S70, the execution of the each shock absorber damping force control program is temporarily ended at step S75.

When the driving state is brought into the straight running from the turning state and the roll angle of the vehicle body BD decreases, a "Yes" determination is again made at step S64, i.e., it is determined that the absolute value |ΔGy| of the differentiated value ΔGy of the lateral acceleration Gy is greater than the predetermined threshold value ΔGyo at step S64, so that the processes at steps S65 to S70 are executed after that like the above-mentioned case.

On the other hand, the vehicle starts to turn in the rightward direction from the straight running state, the processes at steps S60 to S62, at steps S64 and S65 are executed, like the case of the vehicle starting to turn in the leftward-direction, and thereafter, a "No" determination is made at step S66, i.e., it is determined that the vehicle turns in the rightward direction at step S66, so that the processes at step S72 and the following steps are executed. At step S72, the stroke speed Xfrd of the front right wheel FR is set as the stroke speed Xfind of the front wheel at the inner side of the turning locus, the stroke speed Xfld of the front left wheel FL is set as the stroke speed Xfoutd of the front wheel at the outer side of the turning locus, the stroke speed Xrrd of the rear right wheel RR is set as the stroke speed Xrind of the rear wheel at the inner side of the turning locus, and the stroke speed Xrld of the rear left wheel RL is set as the stroke speed Xroutd of the rear wheel at the outer side of the turning locus.

At step S73, the damping coefficients Cj (j=fin, fout, rin, rout) of the shock absorbers 10 each corresponding to the front wheel at the inner side of the turning locus, front wheel at the outer side of the turning locus, rear wheel at the inner side of the turning locus, and the rear wheel at the outer side of the turning locus are calculated on the basis of the aforesaid equations (12) to (15), like the process at step S68. At step S74, the damping coefficients Cj (j=fin, fout, rin, rout) calculated at step S73 are respectively set as the damping coefficients Ci (i=fr, fl, rr, rl) of the shock absorbers 10 each corresponding to the front left wheel, front right wheel, rear left wheel, and rear right wheel. Then, at step S70, the operation of the corresponding actuator 31 is controlled in accordance with the damping coefficients Ci (i=fl, fr, rl, rr) set at step S74. After the process at step S70, the execution of the each shock absorber damping force control program is temporarily ended at step S75. After that, the processes at steps S60 to S62, at steps S64 to 866, and at step S72 and the following steps are repeatedly executed during when the roll angle of the vehicle body BD increases, like the above-mentioned case. When the increase in the roll angle of the vehicle body BD is stopped, the processes at step S71 and the following steps are executed after the process at step S64. When the roll angle of the vehicle body BD starts to decrease from this state, the processes at step S72 and the following steps are again executed after the process at step S66.

Figure 7:
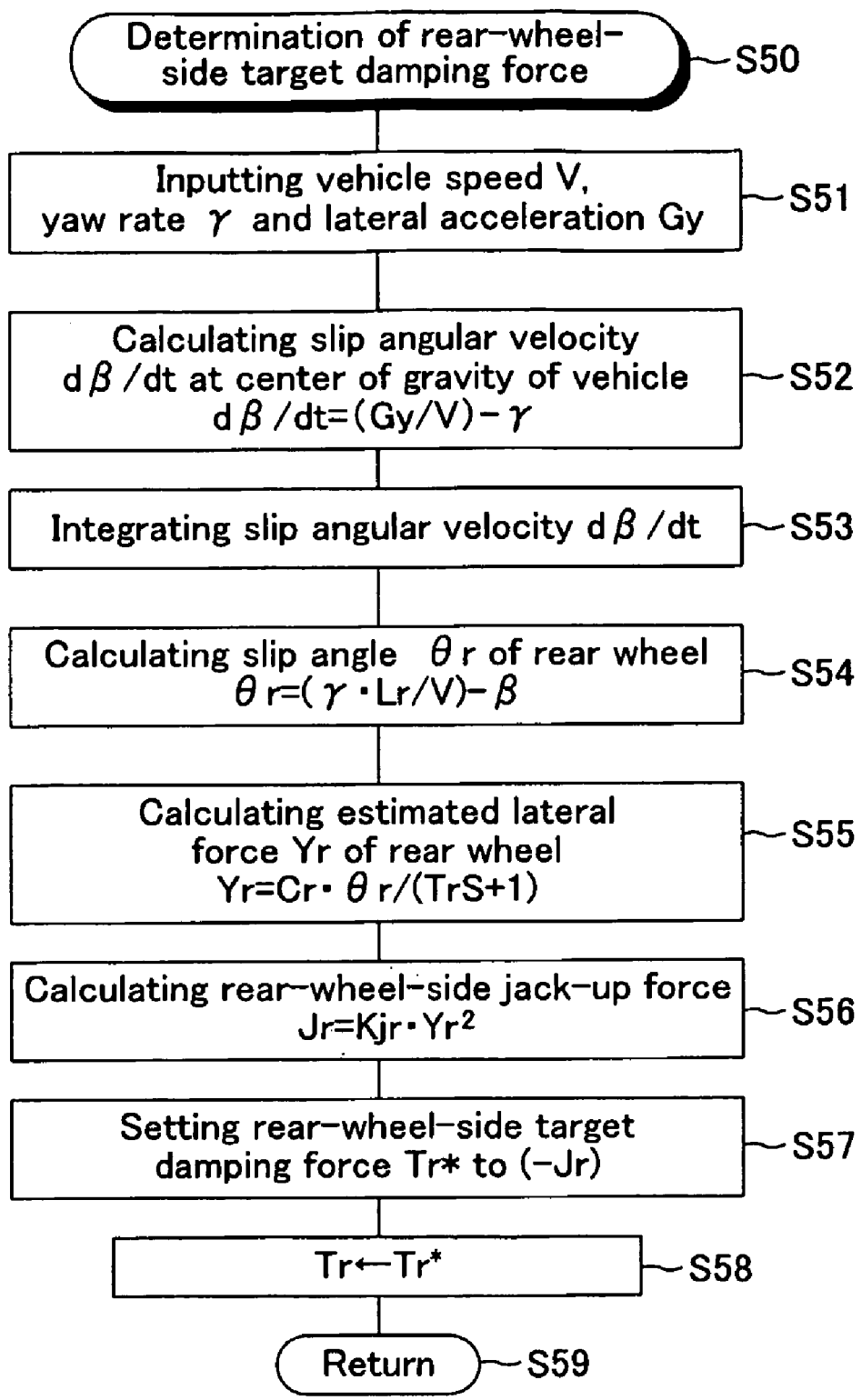
FIG. 7 is a flowchart showing a rear-wheel-side target damping force determination program executed by the electronic control unit shown in FIG. 1 according to the first embodiment and its modified example of the present invention.
Figure 10:
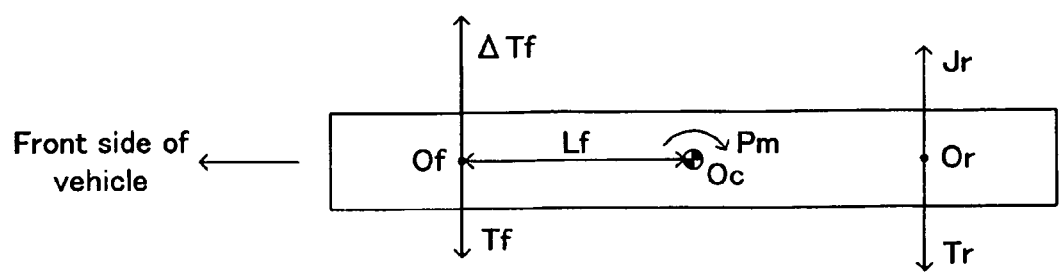
FIG. 10 is an explanatory view showing an input applied to the front-wheel-side vehicle body and the rear-wheel-side vehicle body in the vertical direction by the execution of the roll and pitching suppression control program shown in FIG. 3 according to the first embodiment of the present invention.

As understood from the explanation of the operation, the total Tr of the damping forces generated by the rear-wheel-side shock absorbers 10 is set at the rear-wheel side vehicle body by the processes at steps S57 and S58 in FIG. 7 so as to overcome the rear-wheel-side jack-up force Jr in the first embodiment. Therefore, the lift-up at the center of gravity of the vehicle at the rear wheel side is suppressed as shown in FIG. 10.

Figure 6:
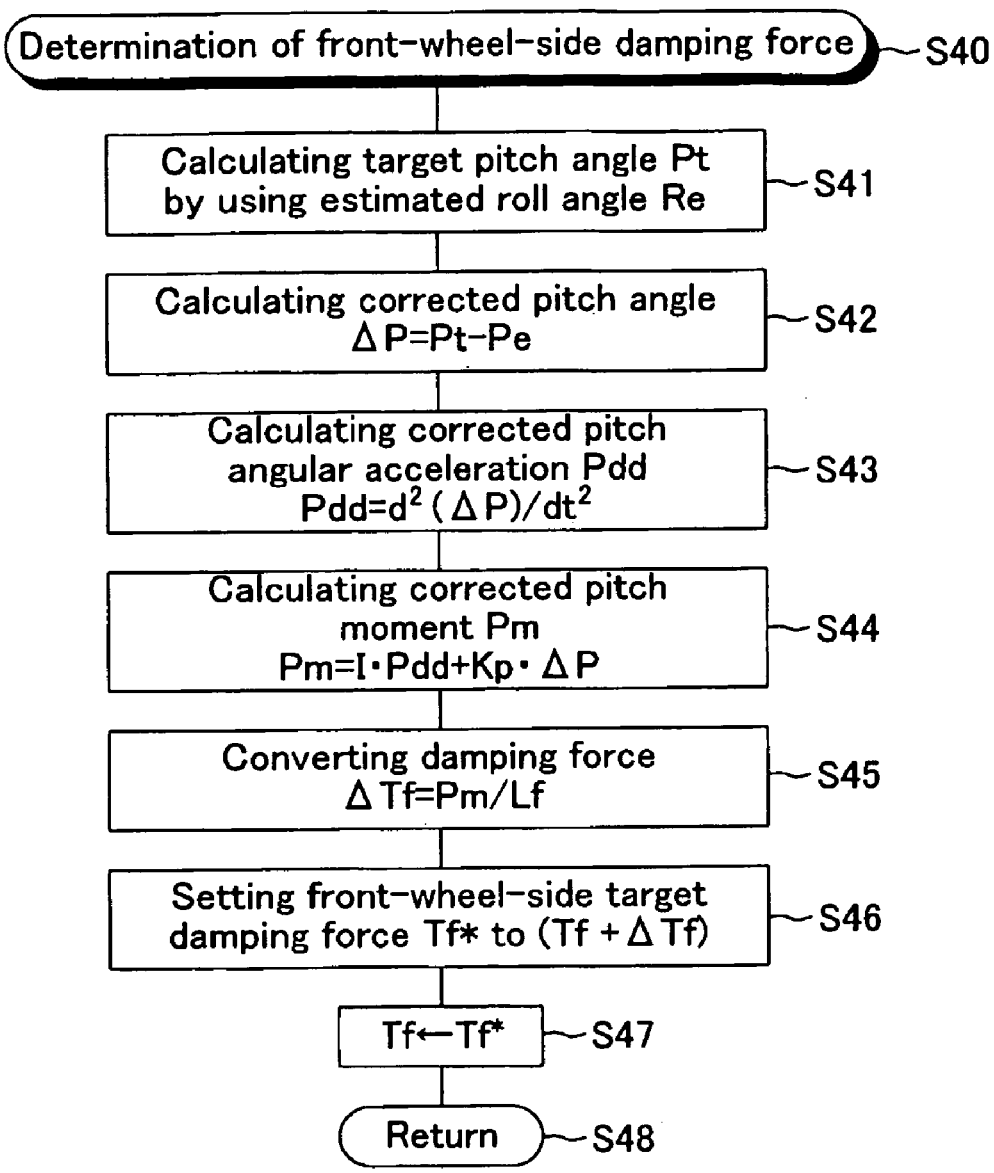
FIG. 6 is a flowchart showing a front-wheel-side target damping force determination program executed by the electronic control unit shown in FIG. 1 according to the first embodiment and its modified example of the present invention.

The total (Tf+ΔTf) of the damping forces generated by the front-wheel-side shock absorbers 10 is set at the front-wheel-side vehicle body by the processes at steps S45 and S46 in FIG. 6 in order to achieve the target pitch angle Pt that is unambiguously determined by the estimated roll angle Re. Specifically, when the estimated pitch angle Pe is greater than the target pitch angle Pt, for example, the force whose input total directs in the upward direction is applied to the center of gravity Of the vehicle at the front wheel side such that the estimated pitch angle Pe is made difficult to be apart from the target pitch angle Pt in order to suppress the excessive forward tilting of the vehicle body BD (see FIG. 10). On the other hand, when the estimated pitch angle Pe is smaller than the target pitch angle Pt, for example, the force whose input total directs in the downward direction is applied to the center of gravity Of the vehicle at the front wheel side such that the estimated pitch angle Pe is made easy to be close to the target pitch angle Pt in order to promote the forward tilting of the vehicle body BD to a predetermined position.

Therefore, during the turning of the vehicle, the roll of the vehicle body BD is suppressed as well as the rise of the vehicle at the center of gravity Oc is suppressed, and in addition, the pitching of the vehicle body BD is suppressed as well as the vehicle body BD is easy to be kept in a predetermined forward tilting posture. Accordingly, driveability and grip feeling to the road surface are enhanced.

The first embodiment has a feature that the target pitch angle Pt is unambiguously determined in accordance with the estimated roll angle Re and the target pitch angle Pt non-linearly increases with the increase in the estimated roll angle Re. Accordingly, the phase of the estimated roll angle Re and the phase of the estimated roll angle Pe are matched with each other, whereby the time difference between the estimated roll angle Re and the estimated pitch angle Pe is eliminated. Consequently, roll feeling, i.e., smooth feeling during the roll, is enhanced.

Modified Example

Figure 11:
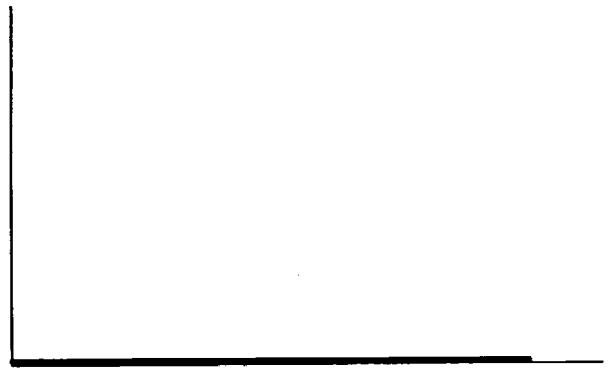
FIG. 11 is a graph showing a change characteristic of a target pitch angle to an estimated roll angle stored in the target pitch angle table, that is different from the target pitch angle table shown in FIG. 9, according to the modified example of the first embodiment of the present invention.

Subsequently, a modified example of the first embodiment will be explained. In this modified example, the electronic control unit 40 executes the roll and pitching suppression control program shown in FIG. 3, and executes the front-wheel-side target damping force determination program (see FIG. 6) at step S12, like the first embodiment. It should be noted that, in this modified example, instead of referring to the target pitch angle table shown in FIG. 9, the target pitch angle table shown in FIG. 11 is referred to in the execution of the process at step S41 in the front-wheel-side target damping force determination program. The other sections are same as those in the first embodiment.

In this modified example, the total Tr of the damping forces generated by the rear-wheel-side shock absorbers 10 is set at the rear-wheel-side vehicle body by the processes at steps S57 and S58 shown in FIG. 7 so as to overcome the rear-wheel-side jack-up force Jr, like the first embodiment. Further, the total (Tf+ΔTf) of the damping forces generated from the front-wheel-side shock absorbers 10 is set at the front-wheel-side vehicle body by the processes at steps S45 and S46 shown in FIG. 6 so as to make the pitch angle of the vehicle body BD zero as shown in FIG. 11. Accordingly, the roll and pitching of the vehicle body BD during the turning can be suppressed, and driveability is enhanced by this modified example.

In the first embodiment, when the target pitch angle Pt is calculated by referring to the target pitch angle table, the target pitch angle Pt increases with the increase in the estimated roll angle Re and the target pitch angle Pt is unambiguously determined in accordance with the estimated roll angle Re. Further, in the modified example of the first embodiment, the target pitch angle Pt is unambiguously set to zero regardless of the estimated roll angle Re. However, in case where the target pitch angle Pt is set, a slight hysteresis may be provided within the range where satisfactory roll feeling is secured such that the target pitch angle Pt is set so as to be different in the case of increasing the estimated roll angle Re and in the case of decreasing the estimated roll angle Re, for example.

In the first embodiment and its modified example, the roll angular acceleration of the vehicle Rdd and the pitch angular acceleration Pdd are respectively calculated on the basis of the sprung accelerations Gzfl, Gzfr, Gzrl, and Gzrr detected by the sprung acceleration sensors 41fl, 41fr, 41rl and 41rr, and the calculated roll angular acceleration Rdd and the pitch angular acceleration Pdd are subject to second-order time integration to calculate the estimated roll angle Re and the estimated pitch angle Pe. However, the invention is not limited thereto. For example, the estimated roll angle Re and the estimated pitch angle Pe may be calculated in accordance with the strokes Xi (i=fl, fr, rl, rr) detected by the height sensors 42fl, 42fr, 42rl and 42rr.

Second Embodiment

Subsequently, a second embodiment of the present invention will be explained. The damping force control apparatus according to the second embodiment has a steering angle sensor 46 as shown by a broken line in FIG. 1. The steering angle sensor 46 detects a steering angle δ of a steering handle not shown. The steering angle δ represents the steering angle of a steering handle upon the turning in the leftward direction or rightward direction by the positive or negative value. The electronic control unit 40 according to the second embodiment executes a front-wheel-side and rear-wheel-side target damping force determination program shown in FIG. 12, instead of the front-wheel-side target damping force determination program at step S12 (see FIG. 6) and the rear-wheel-side target damping force determination program at step S13 (see FIG. 7), during the execution of the roll and pitching suppression control program shown in FIG. 3. The other sections are same as those in the first embodiment.

The front-wheel-side and rear-wheel-side target damping force determination program is started from step S80. At step S81, the vehicle speed V detected by, the vehicle speed sensor 43, yaw rate γ detected by the yaw rate sensor 44, lateral acceleration Gy detected by the lateral acceleration sensor 45, and steering angle δ of the steering handle detected by the steering angle sensor 46 are inputted. At steps S82 and S83, the slip angular velocity at the center of gravity of the vehicle dβ/dt (=(Gy/V)−γ) is calculated, and the calculated slip angular velocity at the center of gravity of the vehicle dβ/dt is time-integrated to calculate the slip angle β at the center of gravity of the vehicle, like the processes at steps S52 and S53 in the rear-wheel-side target damping force determination program in FIG. 7.

At step S84, the slip angle θf the front wheel is calculated by using the following equation (29), in addition to the calculation of the slip angle θr (=(γ·Lr/V)−β) of the rear wheel.

$$\theta f = \delta/Ng - (\gamma \cdot Lf/V) - \beta \quad (29)$$

Here, Ng represents a steering gear ratio, and Lf represents the distance between the center of gravity of the vehicle and the front axle.

At step S85, the front-wheel estimated lateral force Yf is calculated by using the following equation (30), in addition to the calculation of the rear-wheel estimated lateral force Yr (=Cr·θr/(TrS+1)).

$$Yf = Cf \cdot \theta f/(TfS+1) \quad (30)$$

Here, Cf represents a cornering power at the front wheel, and Tf represents a time constant of the tire composing the front wheel.

At step S86, the front-wheel-side estimated jack-up force Jf exerted on the front-wheel-side vehicle body is calculated by using the following equation (31), in addition to the calculation of the rear-wheel-side estimated jack-up force Jr (=Kjr·Yr²) exerted on the rear-wheel-side vehicle body.

$$Jf = Kjf \cdot Yf^2 \quad (31)$$

Here, Kjf represents a jack-up coefficient considering the geometry change of the front-wheel-side unsprung member LA or the like.

At step S87, the front-wheel-side estimated jack-up force Jf is added to the total Tf of the damping forces currently generated at the front-wheel-side shock absorbers 10 so as to calculate the input total Ff (Ff=Tf+Jf) applied to the front-wheel-side vehicle body in the vertical direction. At step S88, the input total Fr applied to the rear-wheel-side vehicle body in the vertical direction is calculated by using the following equation (32) so as to overcome the rotational moment about the axis in the side-to-side direction of the vehicle passing the center of gravity Oc of the vehicle due to the above-mentioned input total Ff.

$$Fr=Ff \cdot Lf/Lr \qquad (32)$$

At step S89, the rear-wheel-side jack-up force Jr is subtracted from the input total Fr applied to the rear-wheel-side vehicle body in the vertical direction, to thereby calculate the rear-wheel-side target damping force Tr* (Tr*=Fr−Jr). At step S90, the rear-wheel-side target damping force Tr* calculated at step S89 is set as Tr used in the aforesaid equations (14) and (15). After the process at step S90, the execution of the front-wheel-side and rear-wheel-side target damping force determination program is ended at step S91.

Figure 12:
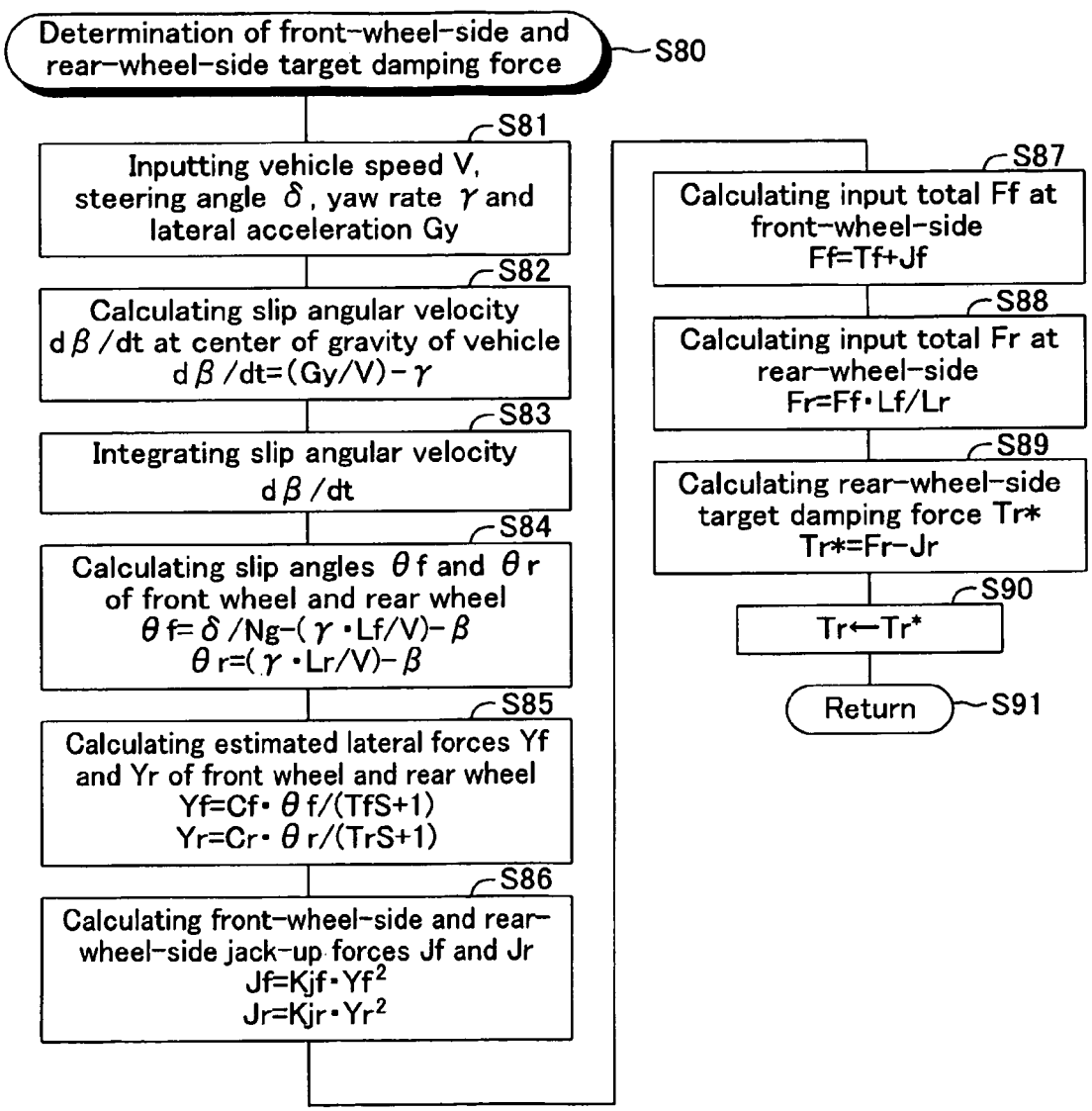
FIG. 12 is a flowchart showing a front-wheel-side and rear-wheel-side target damping force determination program executed by the electronic control unit shown in FIG. 1 according to the second embodiment of the present invention.
Figure 13:
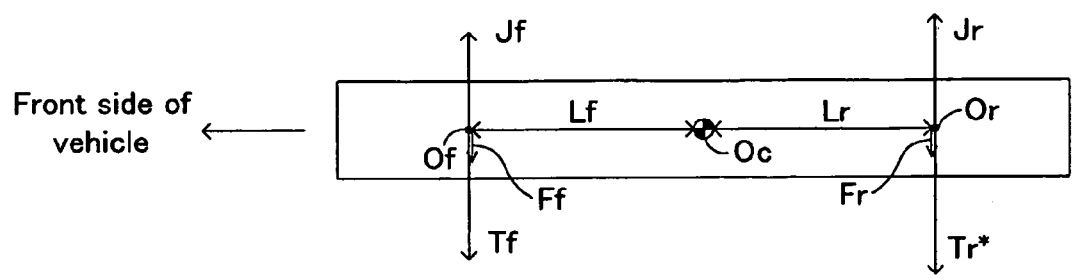
FIG. 13 is an explanatory view showing an input applied to the front-wheel-side vehicle body and the rear-wheel-side vehicle body in the vertical direction by the execution of the roll and pitching suppression control program shown in FIG. 3 according to the second embodiment of the present invention.

According to the second embodiment, the damping force Tf generated by the front-wheel-side shock absorber 10 is added to the front-wheel-side jack-up force Jf to calculate the input total Ff applied to the front-wheel-side vehicle body by the process at step S87 in FIG. 12; and the input total Fr applied to the rear-wheel-side vehicle body is calculated by the process at step S88 so as to overcome the rotational moment about the axis in the side-to-side direction of the vehicle passing the center of gravity Oc of the vehicle due to the above-mentioned input total Ff. Then, the rear-wheel-side jack-up force Jr is subtracted from the calculated input total Fr applied to the rear-wheel-side vehicle body by the process at step S89, whereby the rear-wheel-side target damping force Tr* required to the rear-wheel-side shock absorbers 10 is determined (see FIG. 13). Accordingly, the rear-wheel-side target damping force Tr* required to the rear-wheel-side shock absorbers 10 is easily obtained from a balance relationship of the rotational moment about the axis in the side-to-side direction of the vehicle passing the center of gravity Oc of the vehicle. The operation of each actuator 31 corresponding to the rear-wheel-side shock absorbers 10 is controlled such that the rear-wheel-side shock absorbers 10 take the determined rear-wheel-side target damping force Tr*, whereby the roll and pitching of the vehicle body BD during the turning of the vehicle are suppressed, like the first embodiment and its modified example.

In the second embodiment, the input total Fr applied to the rear-wheel-side vehicle body is calculated from the balance of the rotational moment about the axis in the side-to-side direction of the vehicle passing the center of gravity Oc of the vehicle due to the input total Ff applied to the front-wheel-side vehicle body, and the rear-wheel-side jack-up force Jr is subtracted from the input total Fr applied to the rear-wheel-side vehicle body to thereby determine the rear-wheel-side target damping force Tr* required to the rear-wheel-side shock absorbers 10. On the contrary, it may be configured such that the input total Ff applied to the front-wheel-side vehicle body is calculated from the balance of the rotational moment about the axis in the side-to-side direction of the vehicle passing the center of gravity Oc of the vehicle due to the input total Fr applied to the rear-wheel-side vehicle body, and the front-wheel-side jack-up force Jf is subtracted from the input total Ff applied to the front-wheel-side vehicle body to thereby determine the front-wheel-side target damping force Tf* required to the front-wheel-side shock absorbers 10. In this case too, the roll and pitching of the vehicle body BD during the turning of the vehicle are suppressed, like the second embodiment.

The above is the explanation of each of the embodiments of the present invention. The present invention is not limited to each of the embodiments, but various modifications are possible without departing from the scope of the invention.

For example, in the embodiments, the virtual vehicle model provided with the lift-suppression-use shock absorber which suppresses the lift-up of the vehicle body BD at the virtual position at the inner side of the turning locus during the roll and the roll-suppression-use shock absorber which suppresses the roll of the vehicle body BD are adapted to the actual vehicle model, in order to apply the present invention to a damping force control apparatus capable of suppressing the rise in the center of gravity of the vehicle during the roll suppression control of the vehicle body BD. Accordingly, the roll of the vehicle body BD during the turning of the vehicle is suppressed, and further, the pitching is suppressed, with the result that driveability can be enhanced. However, not only the present invention is applied to the damping force control apparatus in which the virtual vehicle model is adapted to the actual vehicle model, but also the present invention is applicable to a damping force control apparatus that can control damping force of each shock absorber, such as a damping force control apparatus that sets the damping force of the shock absorbers at the outer wheel of the turning locus higher than the damping force of the shock absorbers at the inner wheel of the turning locus during the turning of the vehicle, for example.

The invention claimed is:

1. A vehicle damping force control apparatus comprising:
    shock absorbers disposed between a vehicle body and each of four wheels suspended to the vehicle body by a suspension system, each of which can individually change generated damping force in accordance with a turning state of the vehicle;
    a front-wheel and rear-wheel damping force calculating unit that calculates the total of the damping forces required for the front-wheel-side shock absorbers corresponding to the front wheels and the total of the damping forces required for the rear-wheel-side shock absorbers corresponding to the rear wheels as a front-wheel-side target damping force and a rear-wheel-side target damping force respectively to suppress a pitching caused on the vehicle body during the turning of the vehicle;
    a damping coefficient calculating unit that calculates damping coefficients for the shock absorbers corresponding to the four wheels by using the front-wheel-side target damping force and the rear-wheel-side target damping force respectively to suppress roll exerted on the vehicle body during the turning of the vehicle;
    a shock absorber control unit that controls the damping forces generated by the shock absorbers corresponding to the four wheels respectively in accordance with the calculated damping coefficients;
    a roll angle detecting unit that detects a roll angle of the vehicle body during the turning of the vehicle;
    a pitch angle detecting unit that detects a pitch angle of the vehicle body during the turning of the vehicle;
    a target pitch angle calculating unit that calculates a target pitch angle of the vehicle body in accordance with the detected roll angle; and
    a target damping force determining unit that determines the total of the damping forces required for the front-wheel-side shock absorbers and the total of the damping forces required for the rear-wheel-side shock absorbers as the front-wheel-side target damping force and the rear-wheel-side target damping force respectively to make the detected pitch angle coincide with the calculated target pitch angle.

2. The vehicle damping force control apparatus according to claim 1, wherein the target damping force determining means comprises:
a corrected moment calculating unit that calculates a corrected moment necessary for the vehicle body in accordance with the difference between the calculated target pitch angle and the detected pitch angle;
a front-wheel-side damping force setting unit that sets the total of the damping forces required for the front-wheel-side shock absorbers as the front-wheel-side target damping force in accordance with the calculated corrected moment;
a rear-wheel-side jack-up force calculating unit that calculates rear-wheel-side jack-up force exerted on the vehicle body through the rear-wheel-side suspension system during the turning of the vehicle; and
a rear-wheel-side damping force setting unit that sets the force in the direction for overcoming the calculated rear-wheel-side jack-up force as the rear-wheel-side target damping force.

3. The vehicle damping force control apparatus according to claim 2, wherein the target pitch angle calculating unit calculates the target pitch angle such that posture of the vehicle body becomes forward tilting or horizontal during the turning.

4. The vehicle damping force control apparatus according to claim 1, wherein the target damping force determining unit determines the total damping forces based on vehicle speed, yaw rate, and lateral acceleration of the vehicle body and steering angle of a steering handle.

5. The vehicle damping force control apparatus according to claim 2, wherein the target pitch angle calculating unit calculates the target pitch angle that increases with the increase in the detected roll angle and that is unambiguously determined by the detected roll angle.

6. The vehicle damping force control apparatus according to claim 2, wherein the rear-wheel-side jack-up force calculating unit calculates the rear-wheel-side jack-up force based on vehicle speed, yaw rate, and lateral acceleration of the vehicle body.

7. The vehicle damping force control apparatus according to claim 1, wherein the target pitch angle calculating unit calculates the target pitch angle such that posture of the vehicle body becomes forward tilting or horizontal during the turning.

8. The vehicle damping force control apparatus according to claim 1, wherein the target pitch angle calculating unit calculates the target pitch angle that increases with the increase in the detected roll angle and that is unambiguously determined by the detected roll angle.

9. The vehicle damping force control apparatus according to claim 1, wherein the front-wheel and rear-wheel damping force calculating unit comprises:
a front-wheel-side jack-up force calculating unit that calculates front-wheel-side jack-up force applied to the vehicle body through the front-wheel-side suspension system during the turning of the vehicle;
a rear-wheel-side jack-up force calculating unit that calculates rear-wheel-side jack-up force applied to the vehicle body through the rear-wheel-side suspension system during the turning of the vehicle;
a front-wheel-side damping force setting unit that sets the total of the damping forces required for the front-wheel-side shock absorbers as the front-wheel-side target damping force;
a front-wheel-side vehicle body input calculating unit that calculates the input total applied to the front-wheel-side vehicle body by adding the calculated front-wheel-side jack-up force to the set total of the damping forces required for the front-wheel-side shock absorbers;
a rear-wheel-side vehicle body input calculating unit that calculates the input total applied to the rear-wheel-side vehicle body so as to overcome a pitching moment about the center of gravity of the vehicle due to the calculated input total applied to the front-wheel-side vehicle body; and
a rear-wheel-side target damping force setting unit that sets the total of the damping forces required for the rear-wheel-side shock absorbers as the rear-wheel-side target damping force by subtracting the calculated rear-wheel-side jack-up force from the calculated input total applied to the rear-wheel-side vehicle body.

10. The vehicle damping force control apparatus according to claim 1, wherein the front-wheel and rear-wheel damping force calculating unit comprises:
a front-wheel-side jack-up force calculating unit that calculates front-wheel-side jack-up force applied to the vehicle body through the front-wheel-side suspension system during the turning of the vehicle;
a rear-wheel-side jack-up force calculating unit that calculates rear-wheel-side jack-up force applied to the vehicle body through the rear-wheel-side suspension system during the turning of the vehicle;
a rear-wheel-side damping force setting unit that sets the total of the damping forces required for the rear-wheel-side shock absorbers as the front-wheel-side target damping force;
a rear-wheel-side vehicle body input calculating that calculates the input total applied to the rear-wheel-side vehicle body by adding the calculated rear-wheel-side jack-up force to the set total of the damping forces required for the rear-wheel-side shock absorbers;
a front-wheel-side vehicle body input calculating unit that calculates the input total applied to the front-wheel-side vehicle body so as to overcome a pitching moment about the center of gravity of the vehicle due to the calculated input total applied to the rear-wheel-side vehicle body; and
a front-wheel-side target damping force setting unit that sets the total of the damping forces required for the front-wheel-side shock absorbers as the front-wheel-side target damping force by subtracting the calculated front-wheel-side jack-up force from the calculated input total applied to the front-wheel-side vehicle body.

11. The vehicle damping force control apparatus according to claim 1, wherein the target pitch angle calculating unit refers to a target pitch angle table when calculating the target pitch angle of the vehicle body in accordance with the detected roll angle.

12. The vehicle damping force control apparatus according to claim 11, wherein the target pitch angle table includes a non-linear relationship between the target pitch angle and the detected roll angle.

13. The vehicle damping force control apparatus according to claim 11, wherein the target pitch angle table includes a linear relationship between the target pitch angle and the detected roll angle.

* * * * *